United States Patent
Vermani et al.

(10) Patent No.: US 10,911,120 B2
(45) Date of Patent: Feb. 2, 2021

(54) DOWNLINK (DL) COORDINATED BEAMFORMING PROTOCOLS FOR WIFI

(71) Applicant: QUALCOMM Incorporated, San Diego, CA (US)

(72) Inventors: Sameer Vermani, San Diego, CA (US); Bin Tian, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 3 days.

(21) Appl. No.: 16/042,981

(22) Filed: Jul. 23, 2018

(65) Prior Publication Data
US 2019/0028168 A1    Jan. 24, 2019

Related U.S. Application Data

(60) Provisional application No. 62/536,413, filed on Jul. 24, 2017.

(51) Int. Cl.
| | |
|---|---|
| *H04W 72/04* | (2009.01) |
| *H04B 7/06* | (2006.01) |
| *H04L 25/02* | (2006.01) |
| *H04B 7/0452* | (2017.01) |
| *H04B 7/024* | (2017.01) |

(52) U.S. Cl.
CPC .......... *H04B 7/0626* (2013.01); *H04B 7/024* (2013.01); *H04B 7/0452* (2013.01); *H04B 7/0617* (2013.01); *H04L 25/0224* (2013.01)

(58) Field of Classification Search
CPC .. H04L 25/0224; H04L 5/0035; H04W 72/08; H04W 84/20; H04W 8/005
See application file for complete search history.

(56) References Cited

U.S. PATENT DOCUMENTS

| | | | |
|---|---|---|---|
| 8,774,037 B2 * | 7/2014 | Kim | H04B 7/0617 370/252 |
| 10,098,020 B2 * | 10/2018 | Davydov | H04L 67/36 |
| 10,098,150 B2 * | 10/2018 | Seok | H04W 28/18 |
| 10,341,890 B2 * | 7/2019 | Chen | |
| 10,341,948 B2 * | 7/2019 | Trainin | |

(Continued)

OTHER PUBLICATIONS

International Search Report and Written Opinion—PCT/US2018/043389—ISA/EPO—dated Oct. 18, 2018.

*Primary Examiner* — Phuc H Tran
(74) *Attorney, Agent, or Firm* — Patterson+ Sheridan, L.L.P.

(57) ABSTRACT

Certain aspects relate to methods and apparatus for wireless communication. The apparatus generally includes a first interface configured to output one first frame for transmission to solicit CSI feedback from each of one or more first wireless nodes associated with a first BSS and from each of one or more second wireless nodes associated with a second BSS, a second interface configured to obtain the CSI feedback solicited from the first and second wireless nodes, and a processing system configured to generate data frames for the first wireless nodes based on the CSI feedback solicited from the first wireless nodes, and one or more nulling frames based on the CSI feedback solicited from the second wireless nodes. The first interface is configured to simultaneously output the data frames for beamformed transmission to the first wireless nodes, and the nulling frames for beamformed transmission to the second wireless nodes.

21 Claims, 21 Drawing Sheets

(56) References Cited

U.S. PATENT DOCUMENTS

| | | | |
|---|---|---|---|
| 2014/0315582 A1* | 10/2014 | Dong | H04W 64/00 |
| | | | 455/456.2 |
| 2015/0295629 A1* | 10/2015 | Xia | H04B 7/0491 |
| | | | 370/329 |
| 2015/0372795 A1* | 12/2015 | Wu | H04L 5/0057 |
| | | | 370/329 |
| 2016/0174206 A1* | 6/2016 | Xia | H04B 7/0491 |
| | | | 370/329 |
| 2016/0261327 A1 | 9/2016 | Merlin et al. | |
| 2019/0007996 A1* | 1/2019 | Boudreau | H04B 7/0626 |
| 2019/0044599 A1* | 2/2019 | Kakishima | H04L 1/0026 |
| 2019/0312614 A1* | 10/2019 | Kim | H04B 7/0689 |
| 2020/0068655 A1* | 2/2020 | Ghosh | H04L 5/0053 |

\* cited by examiner

DOWNLINK (DL) COORDINATED BEAMFORMING PROTOCOLS FOR WIFI

CLAIM OF PRIORITY UNDER 35 U.S.C. § 119

This application claims the benefit of U.S. Provisional Patent Application Ser. No. 62/536,413, filed Jul. 24, 2017, which is herein incorporated by reference in its entirety.

BACKGROUND

Field

The present disclosure relates generally to communication systems, and more particularly, to methods and apparatus for downlink (DL) coordinated beamforming protocols using communications systems operating according to wireless technologies.

Description of Related Art

In order to address the issue of increasing bandwidth requirements that are demanded for wireless communication systems, different schemes are being developed to allow multiple user terminals to communicate with a single access point (AP) or multiple APs by sharing the channel resources while achieving high data throughputs. Multiple Input Multiple Output (MIMO) technology represents one such approach that has recently emerged as a popular technique for the next generation communication systems.

A MIMO system employs multiple (NT) transmit antennas and multiple (NR) receive antennas for data transmission. A MIMO channel formed by the NT transmit and NR receive antennas may be decomposed into NS independent channels, which are also referred to as spatial channels, where $N_S \leq \min\{N_T, N_R\}$. Each of the NS independent channels corresponds to a dimension. The MIMO system can provide improved performance (such as higher throughput and greater reliability) if the additional dimensionalities created by the multiple transmit and receive antennas are utilized.

In wireless networks with multiple APs and multiple user stations (STAs), concurrent transmissions may occur on multiple channels toward different STAs, both in uplink and downlink directions. Many challenges are present in such systems. For example, the AP may transmit signals using different standards such as the IEEE 802.11n/a/b/g or the IEEE 802.11ac (Very High Throughput (VHT)) standards. A receiver STA may be able to detect a transmission mode of the signal based on information included in a preamble of the transmission packet.

A downlink multi-user MIMO (MU-MIMO) system based on Spatial Division Multiple Access (SDMA) transmission can simultaneously serve a plurality of spatially separated STAs by applying beamforming at the AP's antenna array. Complex transmit precoding weights can be calculated by the AP based on channel state information (CSI) received from each of the supported STAs.

In a distributed MU-MIMO system, multiple APs may simultaneously serve a plurality of spatially separated STAs by coordinating beamforming by the antennas of the multiple APs. For example, multiple APs may coordinate transmissions to each STA.

As the demand for wireless access continues to increase, there exists a desire for further improvements in wireless technology. Preferably, these improvements should be applicable to other multi-access technologies and the communication standards that employ these technologies.

BRIEF SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description" one will understand how the features of this disclosure provide advantages that include improved communications between access points and stations in a wireless network.

Certain aspects provide an apparatus for wireless communication. The apparatus generally includes a first interface configured to output at least one first frame for transmission to solicit a sounding frame from each of one or more first wireless nodes associated with a first basic service set (BSS) and each of one or more second wireless nodes associated with a second BSS; a second interface configured to obtain the sounding frames from each of the first and second wireless nodes; and a processing system configured to perform uplink channel estimation for each of the first and second wireless nodes based on the sounding frames, generate one or more data frames for the first wireless nodes based on the uplink channel estimation performed for the first wireless nodes, and generate one or more nulling frames based on the uplink channel estimation performed for the second wireless nodes. The first interface is also configured to simultaneously output the data frames for beamformed transmission to the first wireless nodes, and the nulling frames for beamformed transmission to the second wireless nodes.

Certain aspects provide an apparatus for wireless communication. The apparatus generally includes a first interface configured to output at least one first frame for transmission to solicit a sounding frame from each of one or more first wireless nodes associated with a first basic service set (BSS) and each of one or more second wireless nodes associated with a second BSS; a second interface configured to obtain the sounding frames from each of the first and second wireless nodes; and a processing system configured to perform uplink channel estimation for each of the first and second wireless nodes based on the sounding frames, generate one or more data frames for the first wireless nodes based on the uplink channel estimation performed for the first wireless nodes, and generate one or more nulling frames based on the uplink channel estimation performed for the second wireless nodes. The first interface is also configured to simultaneously output the data frames for beamformed transmission to the first wireless nodes, and the nulling frames for beamformed transmission to the second wireless nodes.

Certain aspects provide an apparatus for wireless communication. The apparatus generally includes a first interface configured to obtain at least one first frame from a first wireless node associated with a first basic service set (BSS) and to obtain at least one second from a wireless node associated with a second BSS; a processing system configured to generate first channel state information (CSI) feedback based on the first frame and to generate second CSI feedback based on the second frame; and a second interface configured to output the first CSI feedback for transmission to the first wireless node and to output the first CSI feedback for transmission to the first wireless node.

Aspects generally include methods, apparatus, systems, computer readable mediums, and processing systems, as substantially described herein with reference to and as illustrated by the accompanying drawings. Numerous other aspects are provided.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
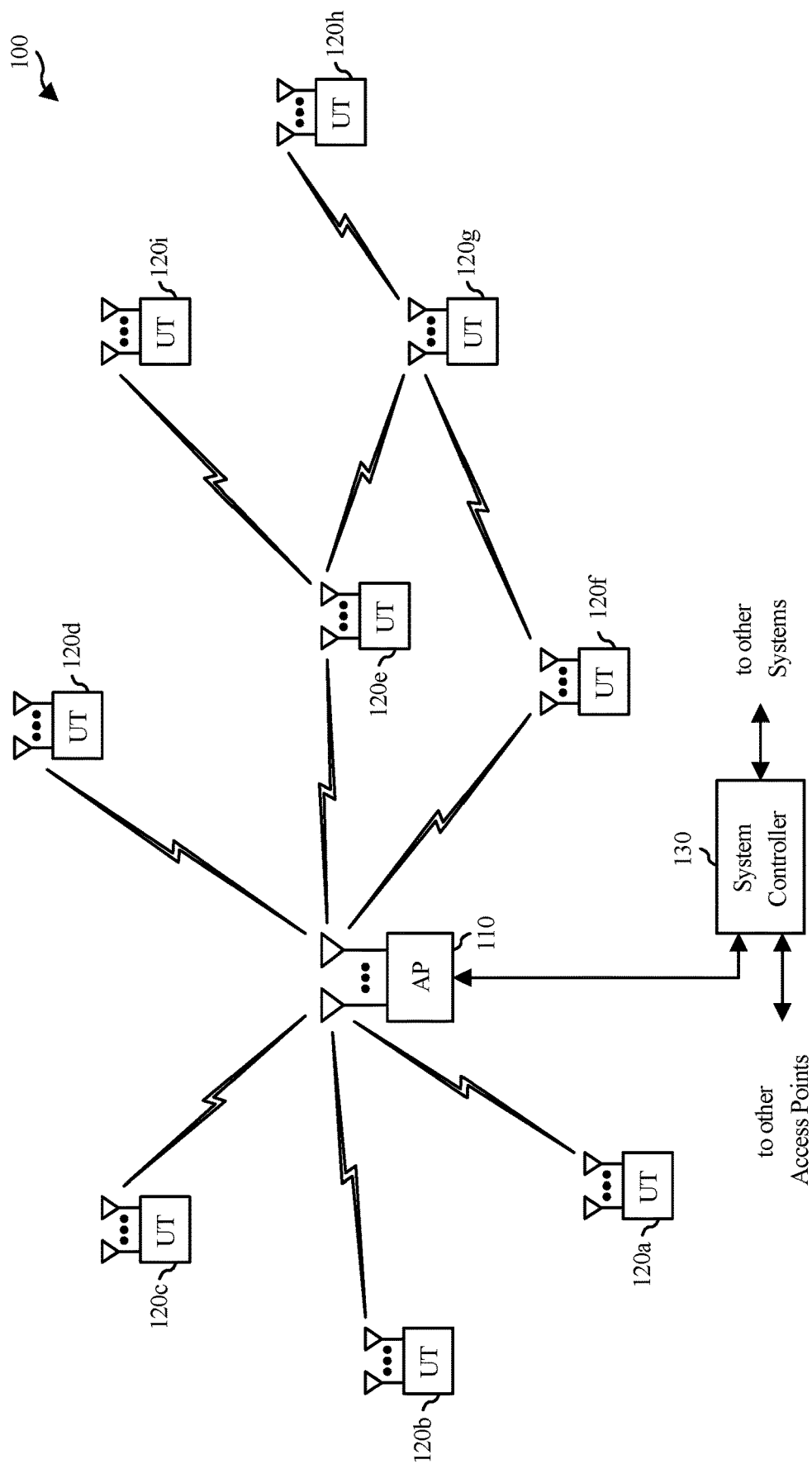
FIG. 1 is a diagram of an example wireless communications network, in accordance with certain aspects of the present disclosure.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

Although particular aspects are described herein, many variations and permutations of these aspects fall within the scope of the disclosure. Although some benefits and advantages of the preferred aspects are mentioned, the scope of the disclosure is not intended to be limited to particular benefits, uses, or objectives. Rather, aspects of the disclosure are intended to be broadly applicable to different wireless technologies, system configurations, networks, and transmission protocols, some of which are illustrated by way of example in the figures and in the following description of the preferred aspects. The detailed description and drawings are merely illustrative of the disclosure rather than limiting, the scope of the disclosure being defined by the appended claims and equivalents thereof.

The following description is directed to certain implementations for the purposes of describing the innovative aspects of this disclosure. However, a person having ordinary skill in the art will readily recognize that the teachings herein can be applied in a multitude of different ways. The described implementations may be implemented in any device, system or network that is capable of transmitting and receiving RF signals according to any of the IEEE 16.11 standards, or any of the IEEE 802.11 standards, the Bluetooth® standard, code division multiple access (CDMA), frequency division multiple access (FDMA), time division multiple access (TDMA), Global System for Mobile communications (GSM), GSM/General Packet Radio Service (GPRS), Enhanced Data GSM Environment (EDGE), Terrestrial Trunked Radio (TETRA), Wideband-CDMA (W-CDMA), Evolution Data Optimized (EV-DO), 1×EV-DO, EV-DO Rev A, EV-DO Rev B, High Speed Packet Access (HSPA), High Speed Downlink Packet Access (HSDPA), High Speed Uplink Packet Access (HSUPA), Evolved High Speed Packet Access (HSPA+), Long Term Evolution (LTE), AMPS, or other known signals that are used to communicate within a wireless, cellular or internet of things (IOT) network, such as a system utilizing 3G, 4G or 5G, or further implementations thereof, technology.

The techniques described herein may be used for various broadband wireless communication systems, including communication systems that are based on a single carrier transmission. Aspects may be, for example, advantageous to systems employing Ultra-Wide Band (UWB) signals including millimeter-wave signals. However, this disclosure is not intended to be limited to such systems, as other coded signals may benefit from similar advantages.

The techniques may be incorporated into (such as implemented within or performed by) a variety of wired or wireless apparatuses (such as nodes). In some implementations, a node includes a wireless node. Such a wireless node may provide, for example, connectivity to or for a network (such as a wide area network (WAN) such as the Internet or a cellular network) via a wired or wireless communication link. In some implementations, a wireless node may include an access point or a user terminal.

Multiple APs may transmit to multiple receiving user terminals at a time by using distributed multi-user multiple input multiple output (MU-MIMO). For example, multiple APs may transmit data to a given user terminal at a time, meaning the transmission of data to the user terminal is distributed between the multiple APs. The multiple APs may utilize beamforming to steer signals spatially to the user terminal. In some implementations, for the multiple APs to perform distributed MU-MIMO, the multiple APs coordinate the beamforming performed by each AP to reduce interference for transmitting data to the user terminal. In some implementations, the multiple APs perform a procedure to form a group of APs to transmit to the user terminal, as discussed herein. Further, in some implementations, to coordinate the beamforming between the multiple APs, the multiple APs perform a sounding procedure to gather feedback information from the user terminal about wireless channels between the multiple APs and the user terminal, as discussed herein. The multiple APs may utilize the feedback information to perform beamforming.

Particular implementations of the subject matter described in this disclosure can be implemented to realize one or more of the following potential advantages. For example, APs are able to form a group for transmitting to a user terminal using over the air signaling as opposed to communicating over a backhaul. This may reduce data congestion on the backhaul. Additionally, the sounding procedures may allow for coordinated gathering of feedback information by multiple APs from user terminals. Accordingly, the feedback information for the multiple APs may include channel conditions for each of the multiple APs coordinated in time, which may improve the accuracy of the beamforming based on the feedback information. Furthermore, the sounding procedures may limit the amount of data exchanged wirelessly to perform the sounding procedures, which may reduce bandwidth usage of wireless channels.

Example Wireless Communication System

FIG. 1 illustrates a multiple-access Multiple Input Multiple Output (MIMO) system 100 with access points and user terminals. For simplicity, only one access point 110 is shown in FIG. 1. An access point (AP) is generally a fixed station that communicates with the user terminals and also may be referred to as a base station or some other terminology. A user terminal may be fixed or mobile and also may be referred to as a mobile station, a station (STA), a client, a wireless device, or some other terminology. A user terminal may be a wireless device, such as a cellular phone, a personal digital assistant (PDA), a handheld device, a wireless modem, a laptop computer, a personal computer, etc.

The access point 110 may communicate with one or more user terminals 120 at any given moment on the downlink and uplink. The downlink (i.e., forward link) is the communication link from the access point to the user terminals, and the uplink (i.e., reverse link) is the communication link from the user terminals to the access point. A user terminal also may communicate peer-to-peer with another user terminal. A system controller 130 couples to and provides coordination and control for the access points.

The MIMO system 100 employs multiple transmit and multiple receive antennas for data transmission on the downlink and uplink. The access point 110 is equipped with a number $N_{ap}$ of antennas and represents the multiple-input (MI) for downlink transmissions and the multiple-output (MO) for uplink transmissions. A set $N_u$ of selected user terminals 120 collectively represents the multiple-output for downlink transmissions and the multiple-input for uplink transmissions. In some implementations, it may be desirable to have $N_{ap} \geq N_u \geq 1$ if the data symbol streams for the $N_u$ user terminals are not multiplexed in code, frequency or time by some means. $N_u$ may be greater than $N_{ap}$ if the data symbol streams can be multiplexed using different code channels with CDMA, disjoint sets of sub-bands with OFDM, and so on. Each selected user terminal transmits user-specific data to and receives user-specific data from the access point. In general, each selected user terminal may be equipped with one or multiple antennas (i.e., $N_{ut} \geq 1$). The $N_u$ selected user terminals can have the same or different number of antennas.

The MIMO system 100 may be a time division duplex (TDD) system or a frequency division duplex (FDD) system. For a TDD system, the downlink and uplink share the same frequency band. For an FDD system, the downlink and uplink use different frequency bands. The MIMO system 100 also may utilize a single carrier or multiple carriers for transmission. Each user terminal may be equipped with a single antenna (such as in order to keep costs down) or multiple antennas (such as where the additional cost can be supported). The MIMO system 100 may represent a high speed Wireless Local Area Network (WLAN) operating in a 60 GHz band.

Figure 2:
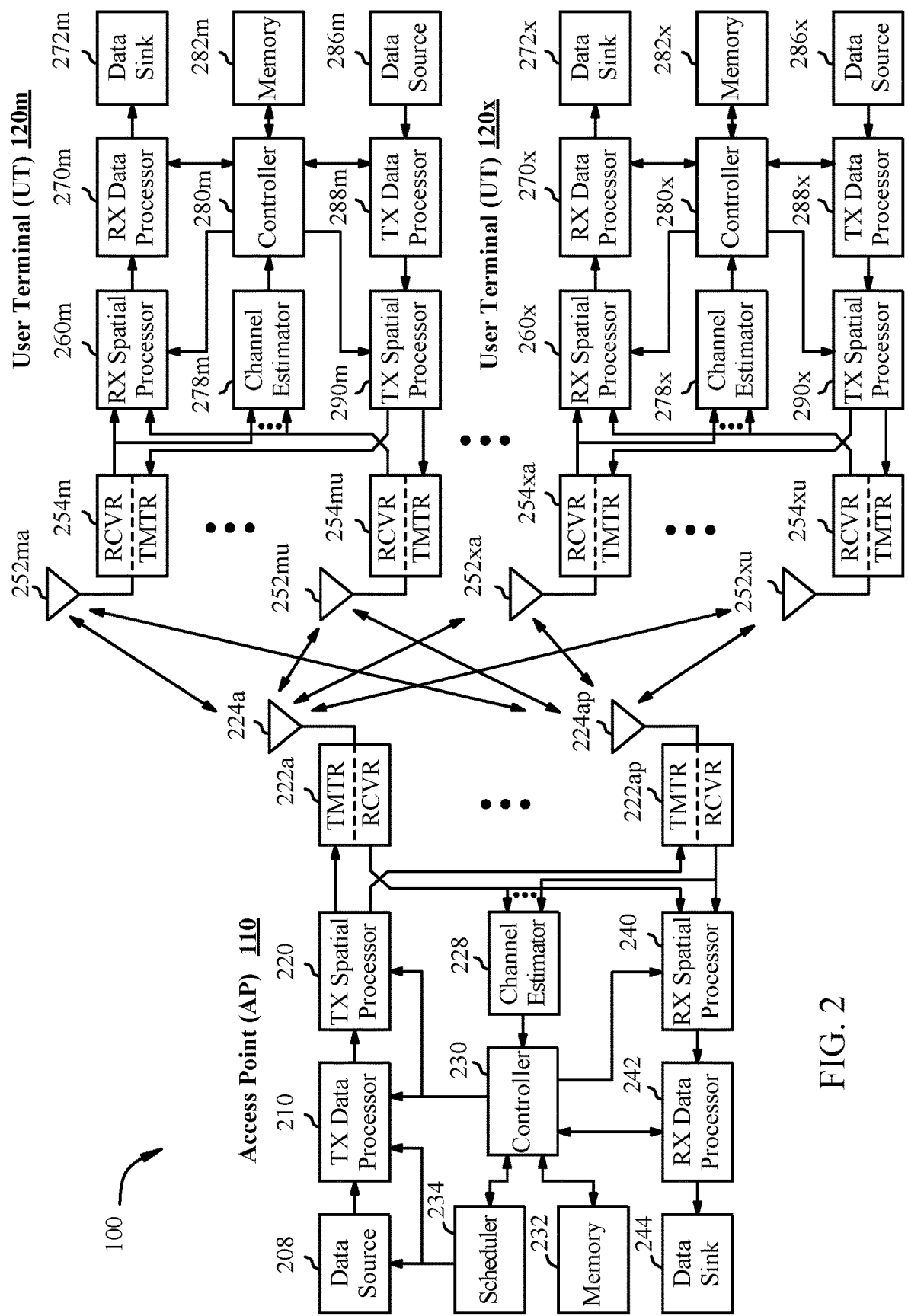
FIG. 2 is a block diagram of an example access point and example stations, in accordance with certain aspects of the present disclosure.

FIG. 2 illustrates example components of the access point 110 and station 120 illustrated in FIG. 1, which may be used to implement aspects of the present disclosure. One or more components of the access point 110 and station 120 may be used to practice aspects of the present disclosure. For example, antenna 224, transmitter/receiver unit 222, processors 210, 220, 240, 242, and/or controller 230 or antenna 252, transmitter/receiver 254, processors 260, 270, 288, and 290, and/or controller 280 may be used to perform the operations described herein and illustrated with reference to FIGS. 7, 7A, 8, 8A, 15, and 15A.

FIG. 2 shows a block diagram of the access point/base station 110 and two user terminals/user equipments 120m and 120x in a MIMO system 100. The access point 110 is equipped with $N_{ap}$ antennas 224a through 224ap. The user terminal 120m is equipped with $N_{ut,m}$ antennas 252ma through 252mu, and the user terminal 120x is equipped with $N_{ut,x}$ antennas 252xa through 252xu. The access point 110 is a transmitting entity for the downlink and a receiving entity for the uplink. Each user terminal 120 is a transmitting entity for the uplink and a receiving entity for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink, $N_{up}$ user terminals are selected for simultaneous transmission on the uplink, and $N_{dn}$ user terminals are selected for simultaneous transmission on the downlink. Moreover, $N_{up}$ may or may not be equal to $N_{dn}$, and $N_{up}$, and $N_{dn}$ may include static values or can change for each scheduling interval. Beamforming (such as beamsteering) or some other spatial processing techniques may be used at the access point and user terminal.

On the uplink, at each user terminal 120 selected for uplink transmission, a TX data processor 288 receive traffic data from a data source 286 and control data from a controller 280. The controller 280 may be coupled with a memory 282. The TX data processor 288 processes (such as encodes, interleaves, and modulates) the traffic data $\{d_{up,m}\}$ for the user terminal based on the coding and modulation schemes associated with the rate selected for the user terminal and provides a data symbol stream $\{s_{up,m}\}$. A TX spatial processor 290 performs spatial processing on the data symbol stream $\{s_{up,m}\}$ and provides $N_{ut,m}$ transmit symbol streams for the $N_{ut,m}$ antennas. Each transmitter unit (TMTR) 254 receives and processes (such as converts to analog, amplifies, filters, and frequency upconverts) a respective transmit symbol stream to generate an uplink signal. The $N_{ut,m}$ transmitter units 254 provide $N_{ut,m}$ uplink signals for transmission from the $N_{ut,m}$ antennas 252 to the access point 110.

A number $N_{up}$ of user terminals may be scheduled for simultaneous transmission on the uplink. Each of these user terminals performs spatial processing on its data symbol stream and transmits its set of transmit symbol streams on the uplink to the access point.

At the access point 110, the $N_{ap}$ antennas 224a through 224ap receive the uplink signals from all $N_{up}$ user terminals transmitting on the uplink. Each antenna 224 provides a received signal to a respective receiver unit (RCVR) 222. Each receiver unit 222 performs processing complementary to that performed by the transmitter unit 254 and provides a received symbol stream. An RX spatial processor 240 performs receiver spatial processing on the $N_{ap}$ received symbol streams from the $N_{ap}$ receiver units 222 and provides $N_{up}$ recovered uplink data symbol streams. The receiver spatial processing is performed in accordance with the channel correlation matrix inversion (CCMI), minimum mean square error (MMSE), successive interference cancellation (SIC), or some other technique. Each recovered uplink data symbol stream $\{\hat{s}_{up,m}\}$ is an estimate of a data symbol stream $\{s_{up,m}\}$ transmitted by a respective user terminal. An RX data processor 242 processes (such as demodulates, de-interleaves, and decodes) each recovered uplink data symbol stream $\{\hat{s}_{up,m}\}$ in accordance with the rate used for that stream to obtain decoded data. The decoded data for each user terminal may be provided to a data sink 244 for storage and a controller 230 for further processing.

On the downlink, at the access point 110, a TX data processor 210 receives traffic data from a data source 208 for $N_{dn}$ user terminals scheduled for downlink transmission, control data from a controller 230, and possibly other data from a scheduler 234. The various types of data may be sent on different transport channels. The TX data processor 210 processes (such as encodes, interleaves, and modulates) the traffic data for each user terminal based on the rate selected for that user terminal. The TX data processor 210 provides $N_{dn}$ downlink data symbol streams for the $N_{dn}$ user terminals. A TX spatial processor 220 performs spatial processing on the $N_{dn}$ downlink data symbol streams, and provides $N_{ap}$ transmit symbol streams for the $N_{ap}$ antennas. Each transmitter unit (TMTR) 222 receives and processes a respective transmit symbol stream to generate a downlink signal. The $N_{ap}$ transmitter units 222 provide $N_{ap}$ downlink signals for transmission from the $N_{ap}$ antennas 224 to the user terminals. The decoded data for each STA may be provided to a data sink 272 for storage and/or a controller 280 for further processing.

At each user terminal 120, the $N_{ut,m}$ antennas 252 receive the $N_{ap}$ downlink signals from the access point 110. Each receiver unit (RCVR) 254 processes a received signal from an associated antenna 252 and provides a received symbol stream. An RX spatial processor 260 performs receiver spatial processing on $N_{ut,m}$ received symbol streams from the $N_{ut,m}$ receiver units 254 and provides a recovered downlink data symbol stream $\{\hat{s}_{dn,m}\}$ for the user terminal. The receiver spatial processing can be performed in accordance with the CCMI, MMSE, or other known techniques. An RX data processor 270 processes (such as demodulates, de-interleaves, and decodes) the recovered downlink data symbol stream to obtain decoded data for the user terminal.

At each user terminal 120, the $N_{ut,m}$ antennas 252 receive the $N_{ap}$ downlink signals from the access point 110. Each receiver unit (RCVR) 254 processes a received signal from an associated antenna 252 and provides a received symbol stream. An RX spatial processor 260 performs receiver spatial processing on $N_{ut,m}$ received symbol streams from the $N_{ut,m}$ receiver units 254 and provides a recovered downlink data symbol stream $\{\hat{s}_{dn,m}\}$ for the user terminal. The receiver spatial processing is performed in accordance with the CCMI, MMSE, or some other technique. An RX data processor 270 processes (such as demodulates, de-interleaves, and decodes) the recovered downlink data symbol stream to obtain decoded data for the user terminal.

Figure 3:
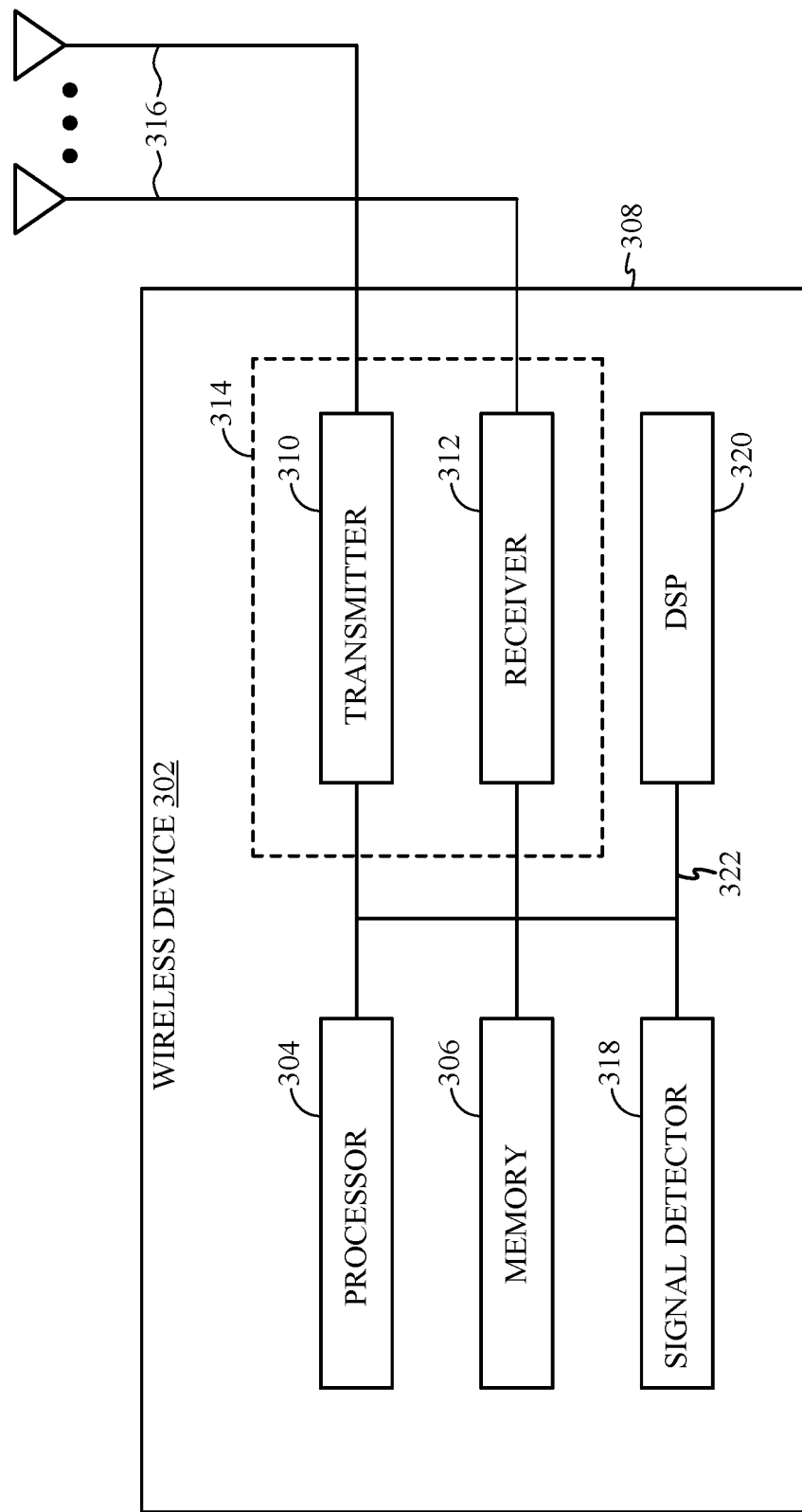
FIG. 3 illustrates an example wireless device, in accordance with certain aspects of the present disclosure.

FIG. 3 illustrates various components that may be utilized in a wireless device 302 that may be employed within the MIMO system 100. The wireless device 302 is an example of a device that may be configured to implement the various methods described herein. The wireless device 302 may be an access point 110 or a user terminal 120.

The wireless device 302 may include a processor 304 which controls operation of the wireless device 302. The processor 304 also may be referred to as a central processing unit (CPU). Memory 306, which may include both read-only memory (ROM) and random access memory (RAM), provides instructions and data to the processor 304. A portion of the memory 306 also may include non-volatile random access memory (NVRAM). The processor 304 typically performs logical and arithmetic operations based on program instructions stored within the memory 306. The instructions in the memory 306 may be executable to implement the methods described herein.

The wireless device 302 also may include a housing 308 that may include a transmitter 310 and a receiver 312 to allow transmission and reception of data between the wireless device 302 and a remote location. The transmitter 310 and the receiver 312 may be combined into a transceiver 314. A plurality of transmit antennas 316 may be attached to the housing 308 and electrically coupled to the transceiver 314. The wireless device 302 also may include (not shown) multiple transmitters, multiple receivers, and multiple transceivers.

The wireless device 302 also may include a signal detector 318 that may be used in an effort to detect and quantify the level of signals received by the transceiver 314. The signal detector 318 may detect such signals as total energy, energy per subcarrier per symbol, power spectral density and other signals. The wireless device 302 also may include a digital signal processor (DSP) 320 for use in processing signals.

The various components of the wireless device 302 may be coupled together by a bus system 322, which may include a power bus, a control signal bus, and a status signal bus in addition to a data bus.

Example Distributed MU-MIMO

As discussed with respect to FIGS. 1-3, a single AP 110 may transmit to multiple receiving user terminals 120 at a time by using multi-user MIMO (MU-MIMO). In particular, the AP 110 includes multiple antennas 224. Using the multiple antennas 224, the AP 110 can utilize beamforming to focus the energy of a transmitted signal spatially (such as to a particular user terminal 120 as a spatial stream). In order to perform beamforming, the AP 110 may exchange frames with the user terminal 120 to measure a channel between the AP 110 and the user terminal 120. For example, the AP 110 may transmit a null data packet (NDP) including one or more long training fields (LTFs) that the user terminal 120 uses to measure the channel. The user terminal 120 may generate a channel feedback information (such as a feedback matrix) based on the channel measurements, and send the feedback matrix to the AP 110. Using the feedback matrix, the AP 110 may derive a steering matrix, which is used to determine how to transmit a signal on each antenna 224 of the AP 110 to perform beamforming. For example, the steering matrix may be indicative of a phase shift, power level, etc. to transmit a signal on each of the antennas 224. For example, the AP 110 may be configured to perform similar beamforming techniques as described in the 802.11ac standard.

In some implementations, multiple APs 110 may be configured to transmit to one or more receiving user terminals 120 at a time utilizing distributed MU-MIMO. There may be multiple different types of MU-MIMO transmissions, including coordinated beamforming (CoBF) and joint processing transmission (JT).

Figure 4:
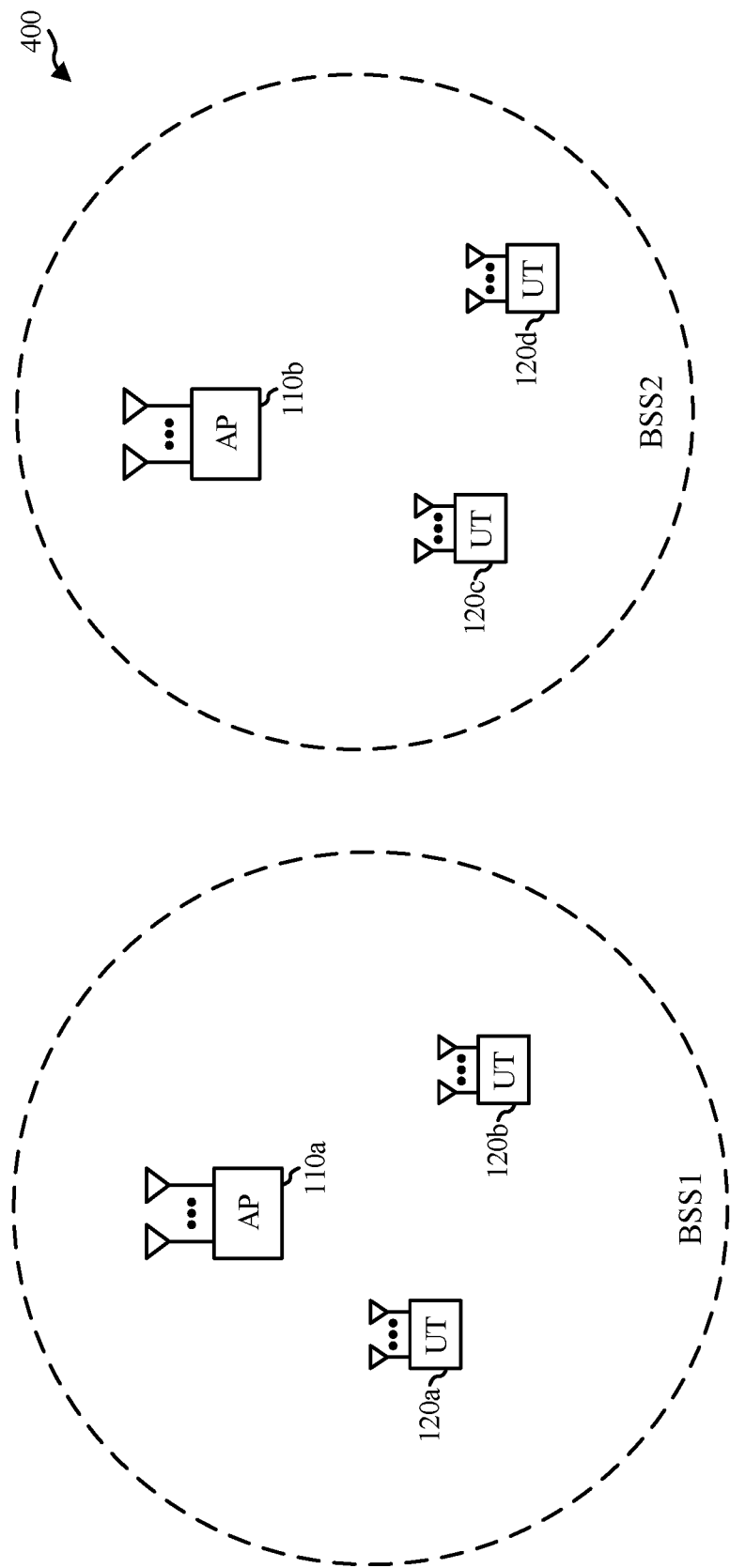
FIG. 4 illustrates an example of a distributed multi-user multiple-input-multiple-output (MU-MIMO) system), in accordance with certain aspects of the present disclosure.

FIG. 4 illustrates a distributed MU-MIMO system 400. As shown, system 400 includes an AP 110a and an AP 110b. The APs 110a and 110b, in some implementations, refer back to the AP 110 described with respect to FIG. 1. The AP 110a is shown as part of a first basic service set (BSS), BSS1, and the AP 110b is shown as part of a second BSS, BSS2. The AP 110a and the AP 110b may be neighboring APs. Further, portions of the coverage area of the AP 110a may overlap with portions of the coverage area of BSS2, leading to an overlapping BSS (OBSS) situation. Communications by the AP 110a with user terminals in BSS1 may be referred to as in BSS communications. Similarly, communication by the AP 110b with user terminals in BSS2 may be referred to as in BSS communications. Further, communications by the AP 110a with user terminals in BSS2 may be referred to as OBSS communications, and communications by the AP 110b with user terminals in BSS1 may be referred to as OBSS communications.

In CoBF, signals (such as data) for a given user terminal may be transmitted by only a single AP. For example, the user terminals 120a and 120b are shown as part of BSS1 and therefore only the AP 110a may transmit signals intended for the user terminals 120a and 120b. Further, user terminals 120c and 120d are shown as part of BSS2 and therefore only the AP 110b may transmit signal intended for the user terminals 120c and 120d. The user terminals 120a through 120d, in some implementations, refer back to the user terminal 120 described with respect to FIG. 1. However, as discussed the coverage area of the AP 110a and the AP 110b may overlap, and therefore signals transmitted by the AP 110a may reach the user terminals 120c and 120d in BSS2 as OBSS signals. Similarly, signals transmitted by the AP 110b may reach the user terminals 120a and 120d in BSS1 as OBSS signals. In CoBF, the APs 110a and 110b may be configured to perform beamforming to form nulls in the direction of user terminals in OBSS, such that any signals received at an OBSS user terminal are of a low power. For example, the AP 110a may be configured to perform beamforming to form nulls toward the user terminals 120c and 120d, and the AP 110b may be configured to form nulls toward the user terminals 120a and 120b to limit the interference at the user terminals. Accordingly, in CoBF, APs are configured to form nulls for OBSS user terminals and configured to beamform signals to in-BSS user terminals.

In JT, signals for a given user terminal may be transmitted by multiple APs. For example, one or more of user terminals 120a through 120d may receive signals from both the AP 110a and the AP 110b. For the multiple APs to transmit data to a user terminal, the multiple APs may all need a copy of the data to be transmitted to the user terminal. Accordingly, the APs may need to exchange the data (such as through a backhaul) between each other for transmission to a user terminal. For example, the AP 110a may have data to transmit to user terminal 120a, and may further communicate that data over a backhaul to the AP 110b. The AP 110a and the AP 110b may then beamform signals including the data to the user terminal 120a.

In some implementations, in JT, the antennas of the multiple APs transmitting to one or more user terminals may be considered as one large antenna array (such as virtual antenna array) used for beamforming and transmitting signals. Accordingly, similar beamforming techniques as discussed and used for transmitting from multiple antennas of a single AP to one or more user terminals, may instead be used for transmitting from multiple antennas of multiple APs. For example, the same beamforming, calculating of steering matrices, etc. for transmitting from multiple antennas of the AP 110*a*, may be applied to transmitting from the multiple antennas of both the AP 110*a* and the AP 110*b*. The multiple antennas of the multiple APs may be able to form signals on a plurality of spatial streams (such as limited by the number of antennas). Accordingly, each user terminal may receive signals on one or more of the plurality of spatial streams. In some implementations, each AP may be allocated a certain number of the plurality of spatial streams for transmission to user terminals in the BSS of the AP. Each spatial stream may be identified by a spatial stream index.

In some implementations, various factors may affect distributed MU-MIMO. For example, one factor may be channel feedback accuracy. As discussed, to perform beamforming APs may exchange signals with user terminals over a communication channel, and the user terminals may make measurements of the channel based on the exchanged signals. The user terminals may further send information regarding the channel measurements to the APs as channel feedback information. The APs may utilize the channel feedback information to perform beamforming. However, the channel conditions may change between when the APs receive the channel feedback information and when the APs actually transmit signals on the channel. This may be referred to as channel aging. Further, there may be inaccuracy due to quantization of the information included in the channel feedback information. This may impact both CoBF and JT distributed MU-MIMO and lead to leakage and interference.

Another factor may be phase offsets between APs. For example, APs may transmit with different phases due to timing synchronization differences between the APs. Further, the difference in phases may drift or change (such as due to phase noise, timing drift, carrier frequency offset (CFO) drift, etc.) between when the channel feedback information is received and when the APs transmit to the user terminals. This change in phase difference may not affect CoBF significantly as each AP performs beamforming independently. However, this change in phase difference may affect JT as the APs perform beamforming together.

Another factor may be timing offset. For example, the delay spread, filter delay, and arrival time spread of APs using JT and CoBF may need to be absorbed with a cyclic prefix (CP). For JT, additionally, the relative timing offset (i.e., the change in timing offset between when the channel feedback information is measured and when the signals are transmitted) also may affect phase offsets and may need to be further controlled.

Another factor may be CFO. In CoBF, the synchronization requirements for CFO may be reduced as compared to JT. Another factor may be gain mismatch, where different APs use different gain states while measuring channels of user terminals. This may have a larger effect on JT than CoBF. In some implementations of CoBF, the largest gain may be approximately 75% of the minimum of number of transmit antennas of any of the APs. In some implementations of JT, the largest gain may be approximately 75% of the sum of the transmit antennas of all the APs.

In some implementations, in MU-MIMO for a single AP transmitting to multiple user terminals, to perform channel measurements for beamforming, all the transmit antennas of the AP are sounded together, meaning that all the transmit antennas transmit NDP during the same transmission time interval (such as TTI, frame, subframe, etc.). All antennas may be sounded together, because if NDPs for each antenna were transmitted at different TTIs, they may be transmitted with different phases and the receiver automatic gain control (RxAGC) at each user terminal receiving the NDPs may be different for different TTIs, which may make it difficult to stitch together measurements from the different NDPs. Further, the relative timing among all transmit antennas for transmitting NDP at the same TTI is constant for all the transmit antennas, and remains the same for when the NDP is transmitted and for when data is later transmitted to the user terminals based on channel feedback information. Therefore, there is no change in relative timing between NDP transmission and data transmission, thereby ensuring better beamforming.

In some implementations, all antennas for multiple APs may be sounded together to transmit NDP together at the same TTI for JT in a joint sounding procedure, to avoid issues discussed. In some implementations, the NDPs of different APs may be sounding at the same TTI using one or more techniques such as time-division multiplexing (TDM), code-division multiplexing (CDM) (such as using a P-matrix), and frequency-division multiplexing (FDM).

For CoBF, the beamforming direction of one AP does not depend on the channels between user terminals and other APs. Accordingly, only loose synchronization may be needed between APs. Therefore, for CoBF, in addition to being able to use a joint sounding procedure, a sequential sounding procedure can be used where APs sound one at a time in separate TTIs and transmit NDPs at different TTIs per AP.

Example Coordinated Downlink (DL) and Uplink (UL) Communications

In downlink (DL) multi-user multiple-input-multiple-output (MU-MIMO), multiple stations may belong to one basic service set (BSS) transmitting in the DL. Other BSSs (OBSSs) within "hearing" range may defer (not transmit on the medium) in response to detecting an on-going transmission. Different BSSs in hearing range of each other may use time-divisional multiplexing (TDM) to transmit in the DL. In coordinated UL MU-MIMO, multiple BSSs carry out simultaneous UL transmissions. Un-used receive spatial dimensions at the AP may be used to null the interference from the other BSS (OBSS) transmissions. This enables a greater degree of spatial multiplexing when there are un-used spatial dimension within the BSS. In other words, the un-used spatial dimensions may allow for concurrent OBSS transmissions in DL.

Figure 5A:
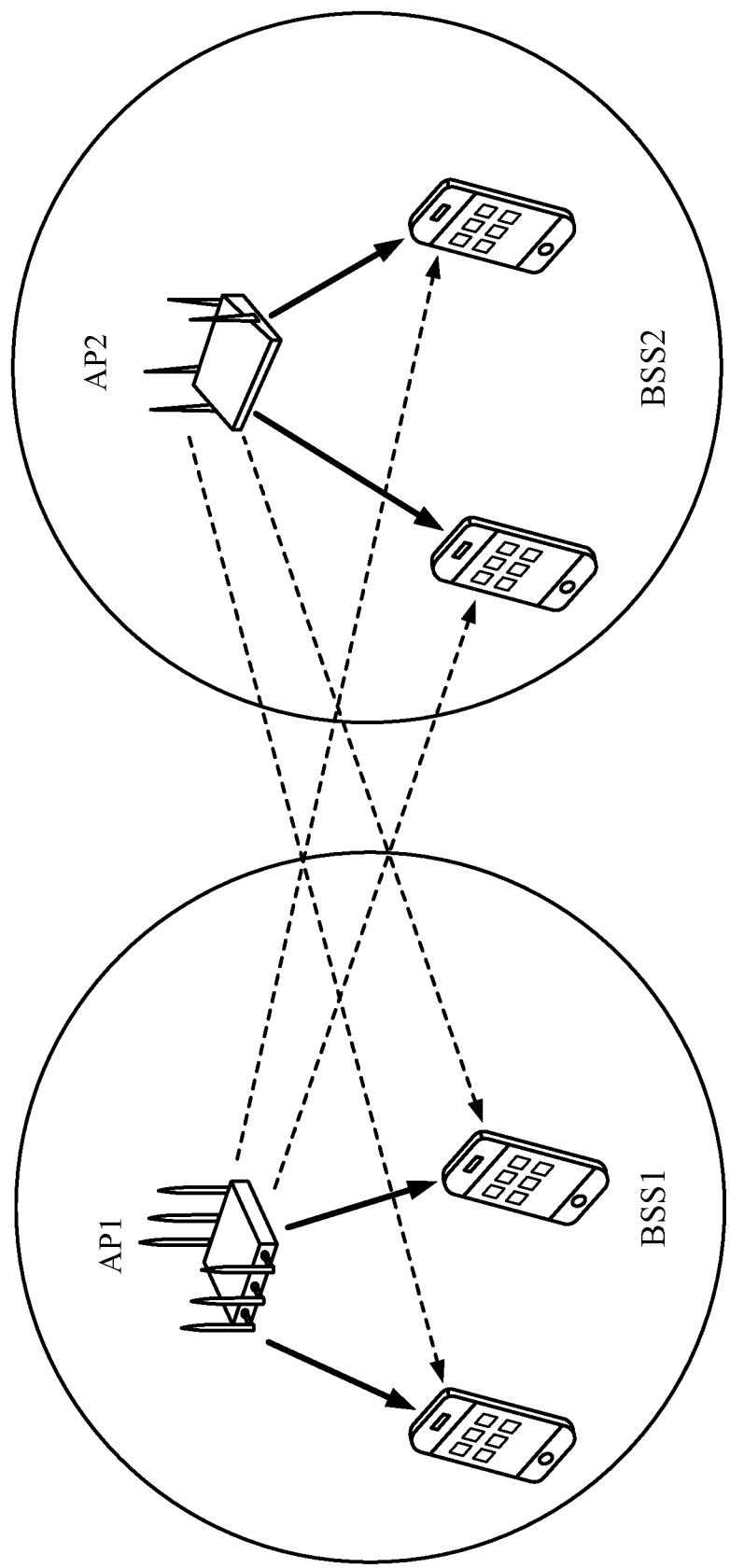
FIG. 5A illustrates a communication system using coordinated downlink (DL) multi-user multiple-input-multiple-output (MU-MIMO), in accordance with certain aspects of the present disclosure.

FIG. 5A illustrates a communication system using coordinated DL MU-MIMO, in accordance with certain aspects of the present disclosure. As illustrated, the signal from each AP is transmitted to only stations within their respective BSSs, as shown by the solid lines representing data transmissions from the AP the STAs that are associated with the AP. The data transmissions from the APs cause interference to the other OBSS stations, as illustrated by the dotted lines. Un-used dimensions at the AP may be used to get rid of (e.g., null out) interference from OBSS APs.

In uplink (UL) multi-user multiple-input-multiple-output (MU-MIMO), multiple stations may belong to one basic service set (BSS) transmitting in the UL. Other BSSs in hearing range may defer to an on-going transmission. Different BSSs in hearing range of each other may use time-divisional multiplexing (TDM) to transmit in the UL. In coordinated UL MU-MIMO, multiple BSSs carry out simultaneous UL transmissions. As with DL MU-MIMO, un-used receive spatial dimensions at an AP may be used to null the interference from the other BSS (OBSS) transmissions, enabling a greater degree of spatial multiplexing and allowing for concurrent OBSS transmissions.

Figure 5B:
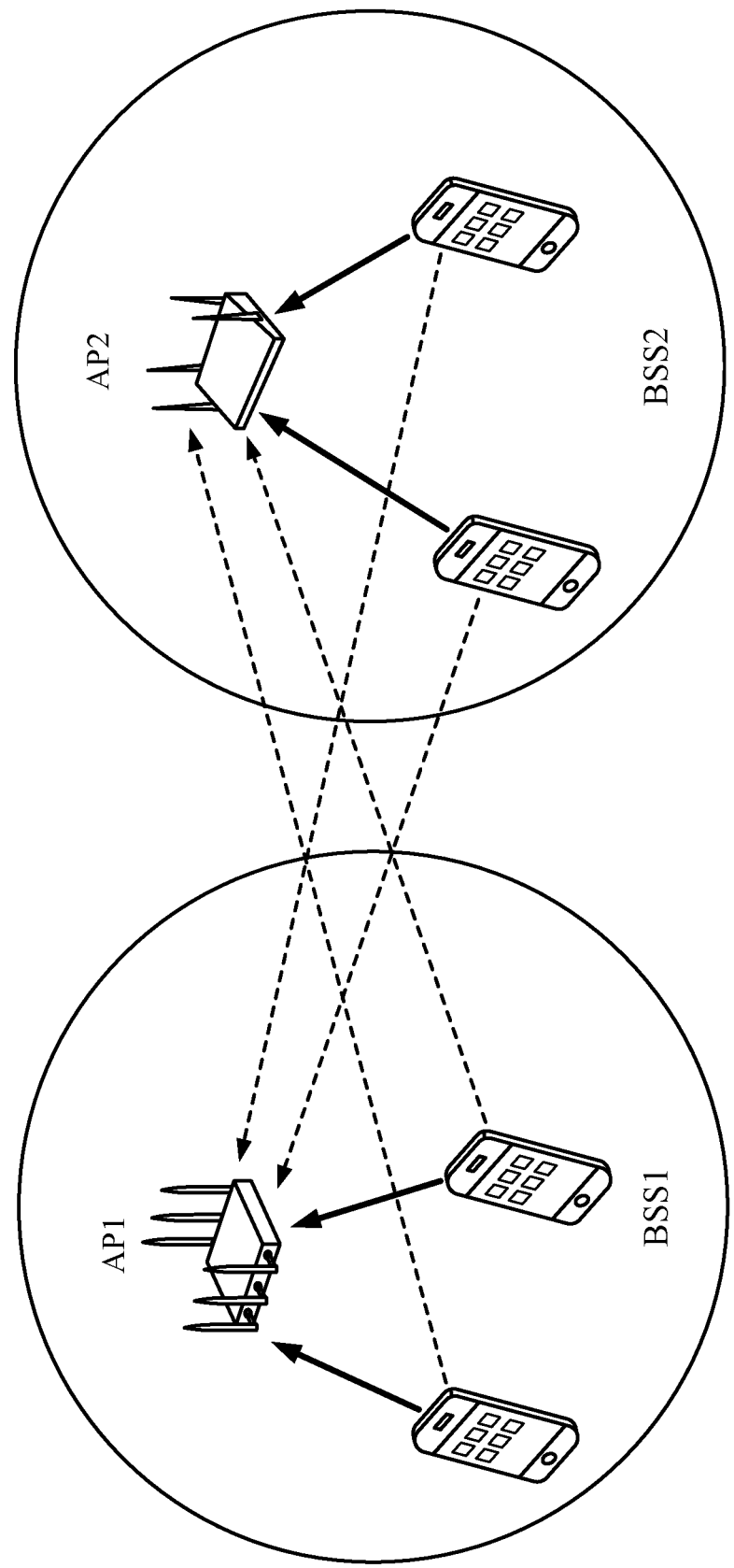
FIG. 5B illustrates a communication system using coordinated uplink (UL) multi-user multiple-input-multiple-output (MU-MIMO), in accordance with certain aspects of the present disclosure.

FIG. 5B illustrates a communication system using coordinated UL MU-MIMO, in accordance with certain aspects of the present disclosure. As illustrated, the signal from each station is transmitted to only one AP within their respective BSSs, as shown by the solid lines representing data transmissions to the AP the STAs are associated with. The data transmissions from the STAs cause interference to the other OBSS APs, as illustrated by the dotted lines. Un-used dimensions at each AP may be used to get rid of (e.g., null out) interference from OBSS STAs.

Figure 6:
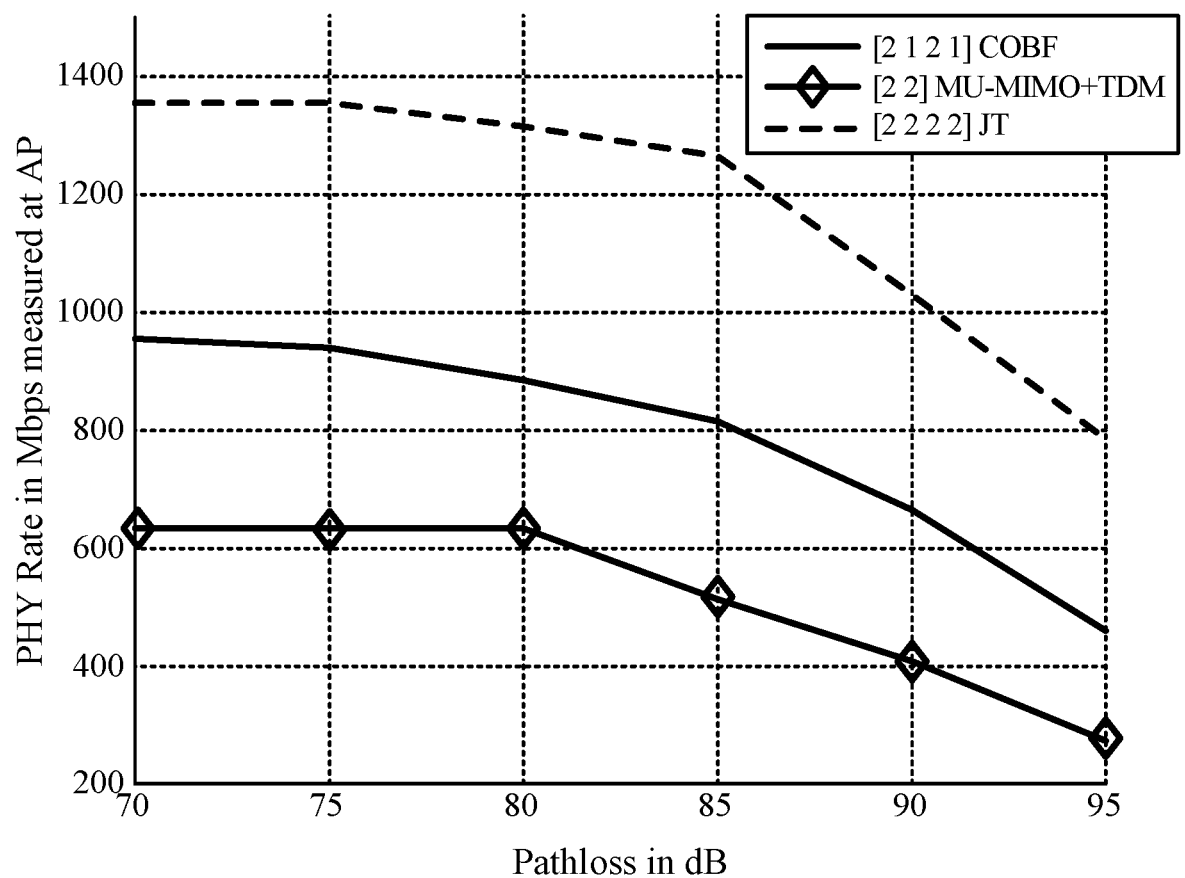
FIG. 6 is a line graph indicating example transmission rates versus path loss, in accordance with certain aspects of the present disclosure.

FIG. 6 is a line graph indicating example transmission rates versus path loss (PL). The line graph shows the opportunistic nature of gains, in accordance with certain aspects of the present disclosure.

As shown, the gains of CoBF in DL may be considered opportunistic in nature, and may happen when certain conditions hold. For example, one such condition may include when the system has a few users to serve in the system's own BSS which are not fully utilizing the APs spatial multiplexing ability. In this case, nulls may be formed to some additional spatial modes, which may allow concurrent transmissions in an OBSS.

As a specific, but non-limiting example, each BSS AP in a 2 BSS system, equipped with eight Tx antennas, may have only two STAs with traffic, each STA having 2 Rx antennas. The system may then provide CoBF transmissions simultaneously in the 2 BSSs with a certain stream allocation. In other words, an AP may demultiplex and extract the transmission intended for it and discard transmission not intended for it. For example, a [2 1 2 1] stream allocation may be provided where a total number of own BSS streams plus the streams to null is equal to 0.75*Ntx.

For comparison, FIG. 6 also plots the joint processing curve for a [2 2 2 2] stream allocation and a 'MU-MIMO+TDM' curve for a [2 2] stream allocation. The four numbers provided in brackets represent stream allocations to the four STAs in the joint processing cases. In the TDM case, there are only two numbers in the brackets because only 2 STAs are being served at any given time.

Example of Downlink (DL) Coordinated Beamforming Protocols for WiFi

In accordance with one or more aspects of embodiments disclosed herein, downlink (DL) coordinated beamforming protocols for WiFi is provided. In one or more cases, coordinated beamforming (CoBF) may include one or more protocols for coordinating (e.g., synchronizing) transmissions from different entities. Particularly, CoBF may form nulls to control interference to other cells (BSSs) while transmitting to own cell (BSS) user(s).

Due to the nulling, only broad synchronization may be needed in these cases. For example, the arrival time spreads at a STA may need to be absorbed in the CP. However, even if arrival time spreads are beyond the CP, one may see graceful degradation in gains. Thus, stringent symbol timing and strict phase/frequency synchronization across APs may not be implemented. This broad synchronization of CoBF schemes is in contrast to joint processing (JT) schemes where the signals at different APs need to be synchronized in a very tight manner.

According to one or more cases, CoBF protocol requirements and design may be provided in accordance with a number of related embodiments, each of which may include one or more relatively loose synchronization protocols, as discussed herein. Further, in one or more cases, even when it may be assumed that no strong backhaul is present, CoBF protocols as disclosed herein may still be implemented. In these cases, the channel state information (CSI) from a STA to an AP's antennas may need to be sent to the relevant AP (e.g., the AP that needs that CSI to select its beamforming vectors), rather than sending the CSI of a STA for antennas of all APs to just one AP and expecting that one AP to disseminate it to other APs through the backhaul.

In coordinated BF, the BF direction of one AP may not depend on the channels between STAs and other APs. Additionally, each AP may work to minimize its interference to non-served STAs (e.g., STAs of OBSSs). Hence, loose phase/time/frequency synchronization among APs may be sufficient to enable joint transmissions.

In accordance with one or more cases, a variety of sounding options may be implemented to enable the generation and feedback of CSI. As illustrative but non-limiting examples, two high level sounding options for explicit sounding with each including three sub-options are described herein.

As will be described in greater detail below, the high level sounding options may include sequential sounding and joint sounding. Sequential sounding may involve one null data packet (NDP) transmission per AP and may sound one AP at a time. In these cases, existing sounding sequences (e.g., 802.11ax sounding sequences) may be leveraged with certain modifications. As an example modification, a null data packet announcement (NDPA) may need to address even OBSS STAs). Joint sounding may use one NDP to sound Tx chains of all the APs. Joint sounding may use slightly less overhead due to certain preamble savings. The NDP may be TDM'd, CDM'd (P matrix), or FDM'd among Tx chains of all APs.

Further additional sounding options may include one or more implicit sounding options. For example, as will be described below with reference to FIGS. 15-17, an implicit sounding option may include separate UL NDP per STA and/or joint UL NDP from all STAs.

Figure 7:
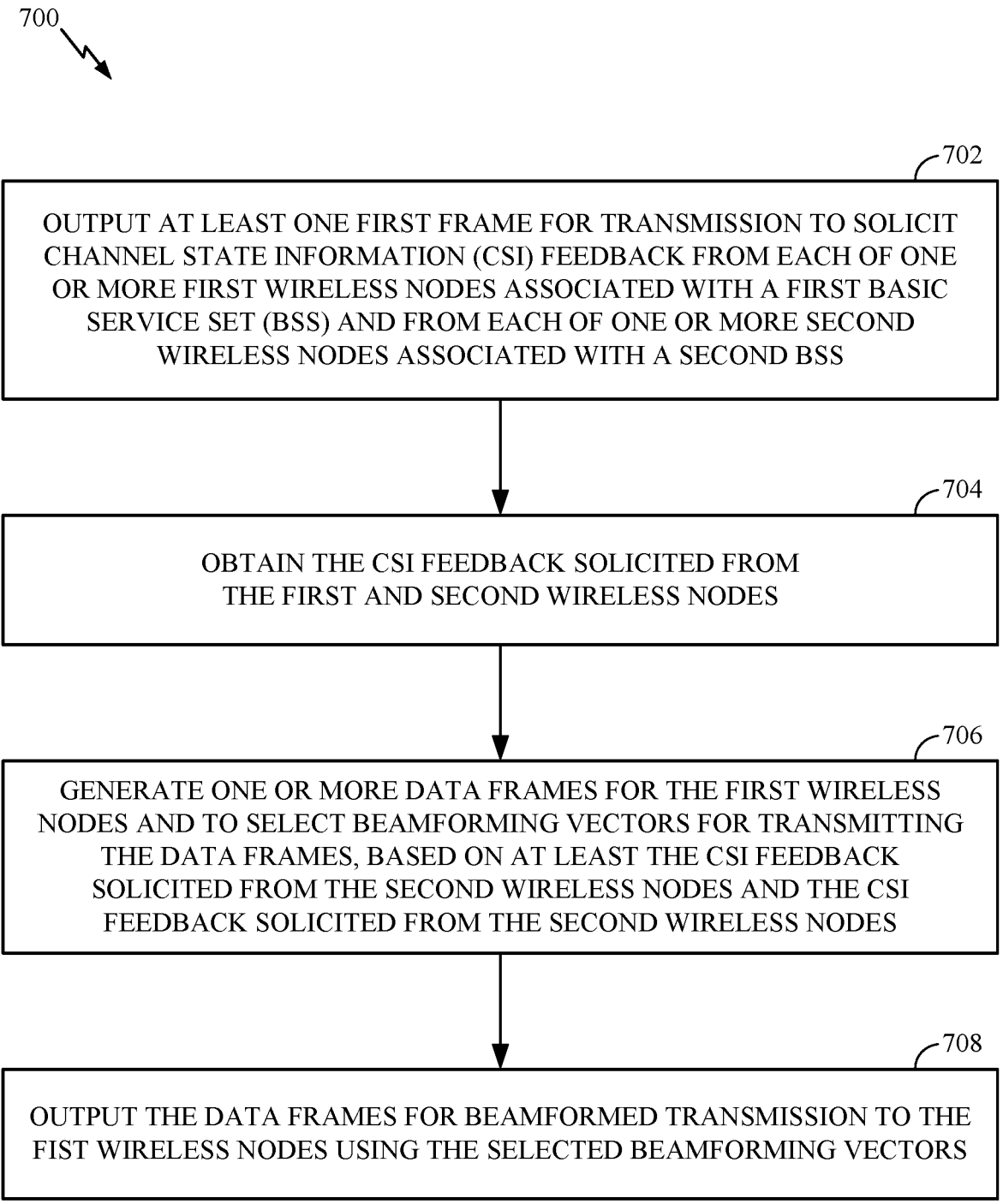
FIG. 7 is a flow diagram of example operations for wireless communication, in accordance with certain aspects of the present disclosure.
Figure 7A:
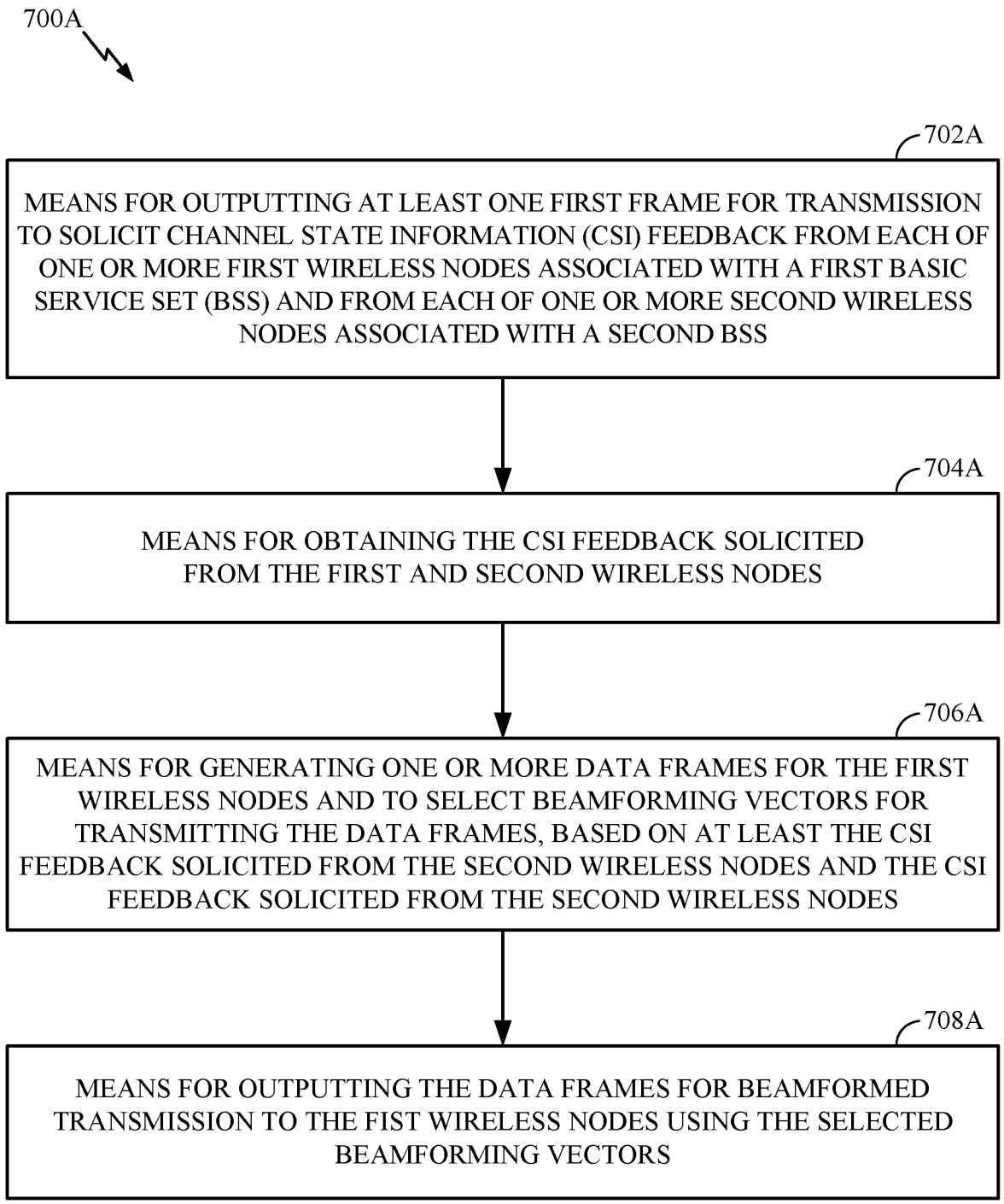
FIG. 7A illustrates example components capable of performing the operations shown in FIG. 7, in accordance with certain aspects of the present disclosure.

FIG. 7 a flow diagram of example operations 700 for wireless communications by an apparatus, in accordance with aspects of the present disclosure. For example, operations 700 may be performed by an access point (AP) participating in CoBF.

Operations 700 begin, at 702, by outputting at least one first frame for transmission to solicit channel state information (CSI) feedback from each of one or more first wireless nodes associated with a first basic service set (BSS) and from each of one or more second wireless nodes associated with a second BSS.

At 704, the apparatus obtains the CSI feedback solicited from the first and second wireless nodes. At 706, the apparatus generates one or more data frames for the first wireless nodes and to select beamforming vectors for transmitting the data frames, based on at least the CSI feedback solicited from the first wireless nodes and the CSI feedback solicited from the second wireless nodes. At 708, the apparatus outputs the data frames for beamformed transmission to the first wireless nodes using the selected beamforming vectors.

Figure 8:
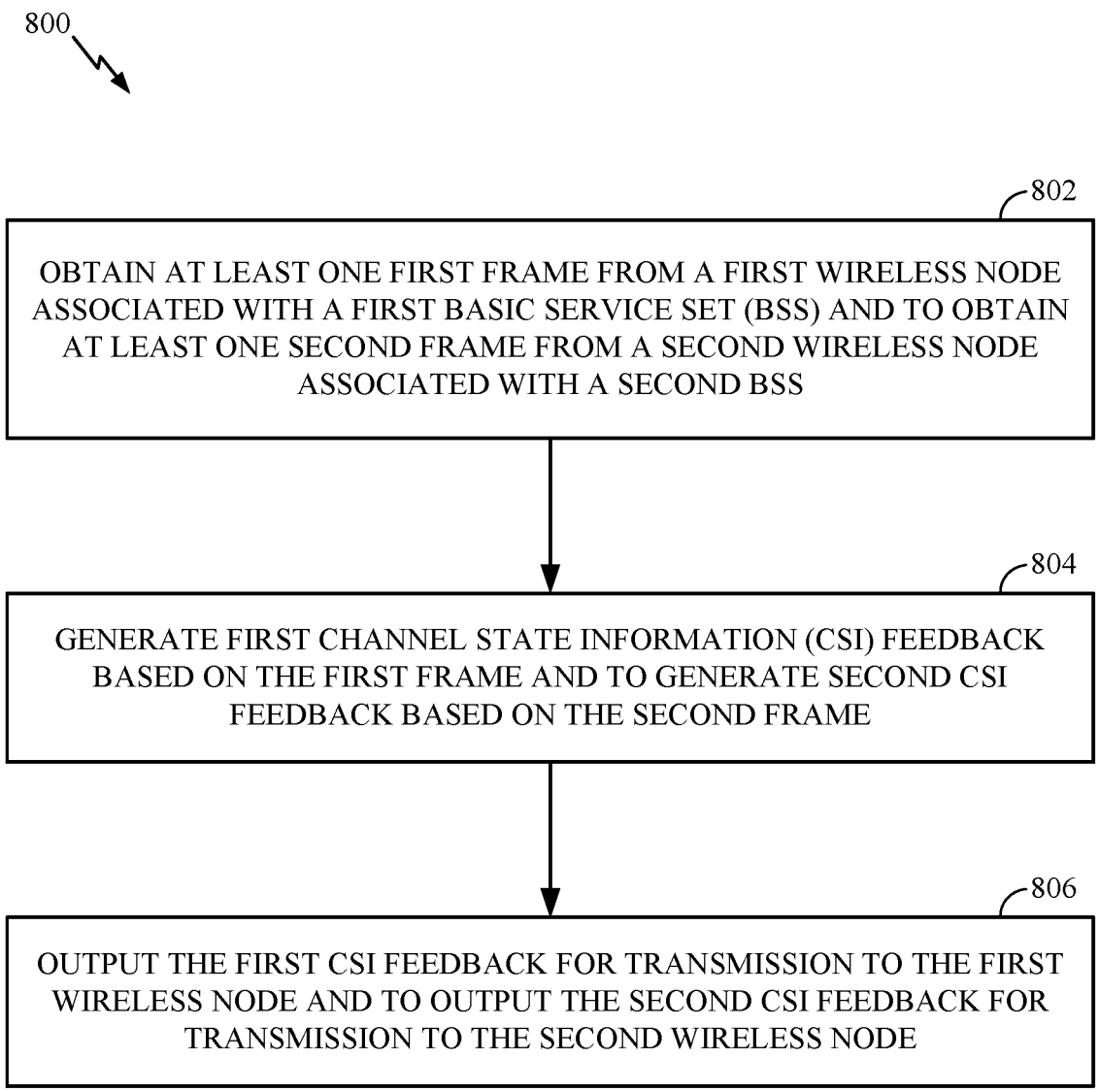
FIG. 8 is a flow diagram of example operations for wireless communication, in accordance with certain aspects of the present disclosure.
Figure 8A:
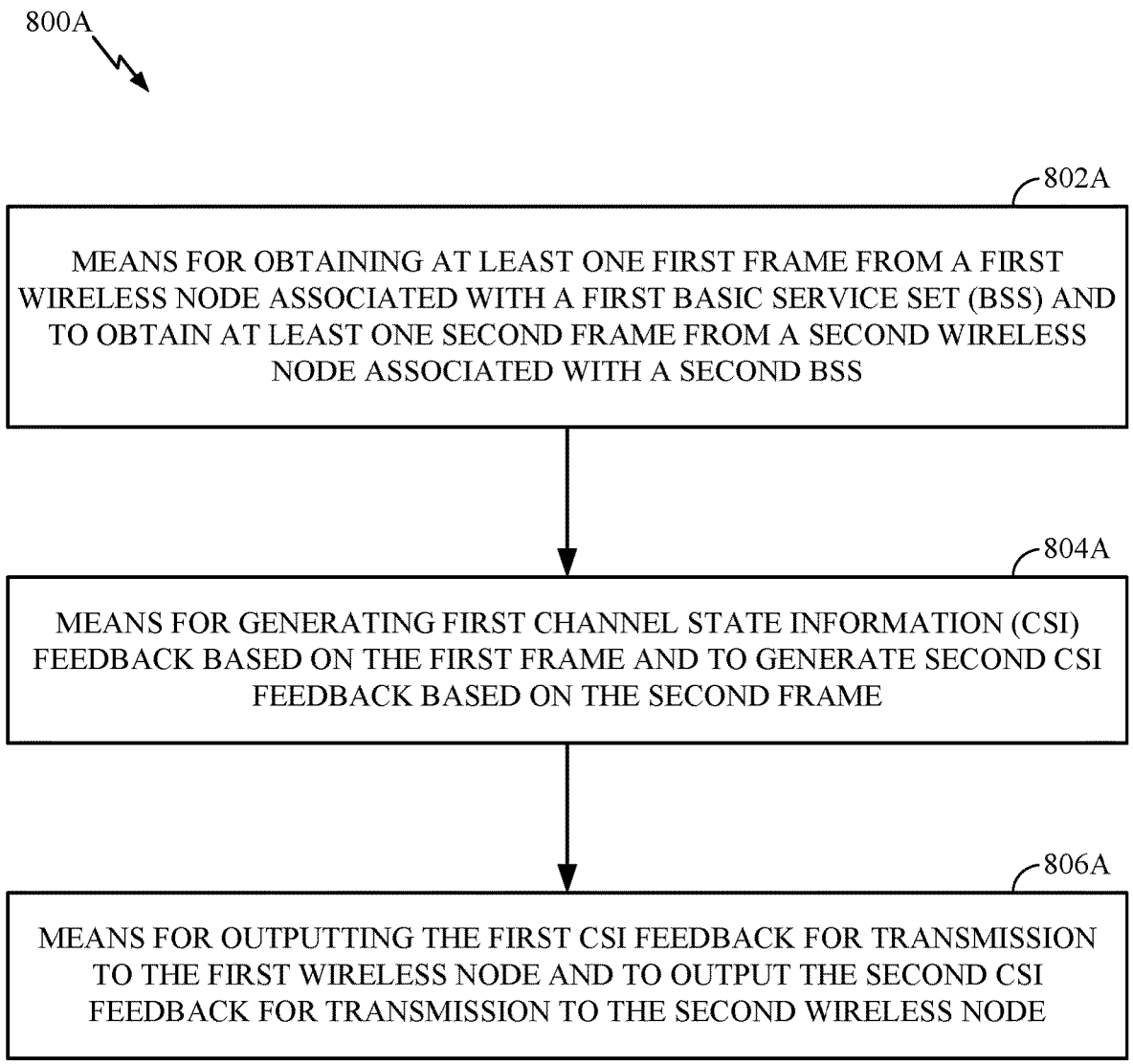
FIG. 8A illustrates example components capable of performing the operations shown in FIG. 8, in accordance with certain aspects of the present disclosure.

FIG. 8 is a flow diagram of example operations 800 for wireless communication by an apparatus, in accordance with certain aspects of the present disclosure. Operations 800 may be performed, for example, by a STA.

The operations 800 begin, at 802, by obtaining at least one first frame from a first wireless node associated with a first basic service set (BSS) and to obtain at least one second frame from a second wireless node associated with a second BSS.

At 804, the apparatus generates first channel state information (CSI) feedback based on the first frame and to generate second CSI feedback based on the second frame. At 806, the apparatus outputs the first CSI feedback for transmission to the first wireless node and to output the second CSI feedback for transmission to the second wireless node.

Figure 9:
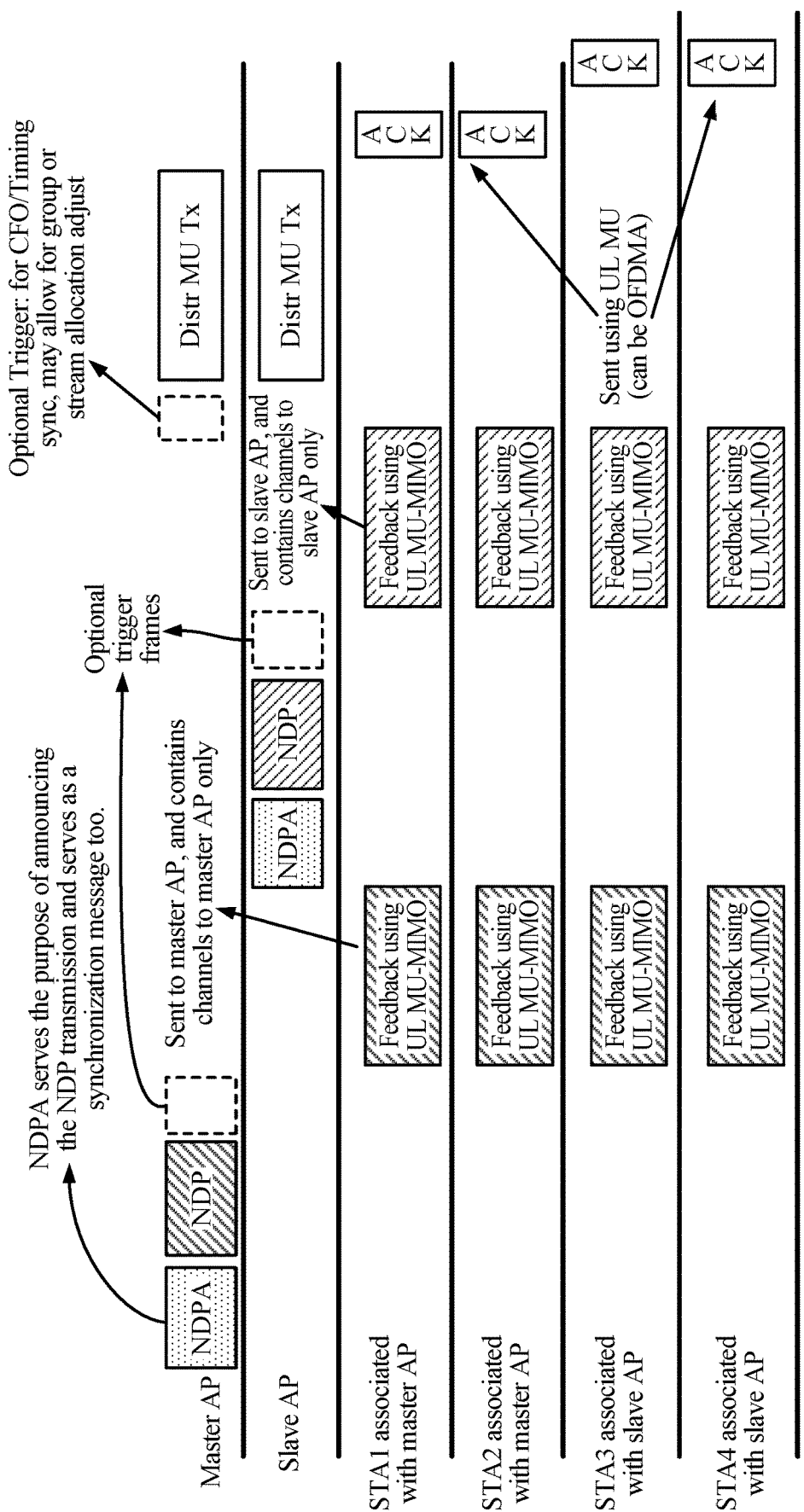
FIG. 9 illustrates a communication protocol for coordinated beamforming (CoBF) including explicit sounding, in accordance with certain aspects of the present disclosure.

FIG. 9 illustrates a communication protocol (referred to herein as A1) for CoBF utilizing explicit sounding, in accordance with certain aspects of the present disclosure. FIG. 9 shows a communication protocol that includes sequential NDP transmissions, such that one AP at a time transmits an NDPA and NDP. In one or more embodiments, it may be assumed that group formation has taken place before the NDPA transmission shown. Assuming the group formation has taken place, the NDPA transmission may identify all STAs and number streams being allocated to each STA.

The NDPA may also serve the purpose of announcing the NDP transmission and may serve as a synchronization message as well. In one or more cases, as shown, an optional trigger frame may be provided after the NDPA and NDP transmissions. In some cases, the trigger frame indicates when the different stations should send the solicited CSI feedback. The stations (STA1 through STA4) may then respond by transmitting feedback using UL MU-MIMO to the corresponding AP that sent the NDPA and NDP. Using the CSI provided during this feedback portion of the protocol, distributed transmissions may follow along with acknowledgements as shown.

As shown in FIG. 9, a master AP may transmit NDPA and NDP (and may or may not also transmit the optional trigger frame). In response, the stations (STA1 through STA4) may respond to the master AP with feedback using UL MU-MIMO that contains information for channels to the master AP only. The slave AP may then transmit NDPA and NDP (along with the optional trigger frame). The stations (STA1 through STA4) may then respond to the slave AP with feedback using UL MU-MIMO that contains information for channels to the slave AP only.

In some embodiments, an optional trigger for carrier frequency offset (CFO) and/or timing synchronization may be transmitted as shown that may allow for group or stream allocation adjustment. What follows then is distributed transmissions (Distr MU Tx) and acknowledgements (ACK) from the stations (STA1 through STA4). The acknowledgements may be sent using UL MU MIMO (e.g., via OFDMA). In one or more cases the ACKs of the two BSSs may be sent in parallel using coordinated UL MU-MIMO.

Figure 10:
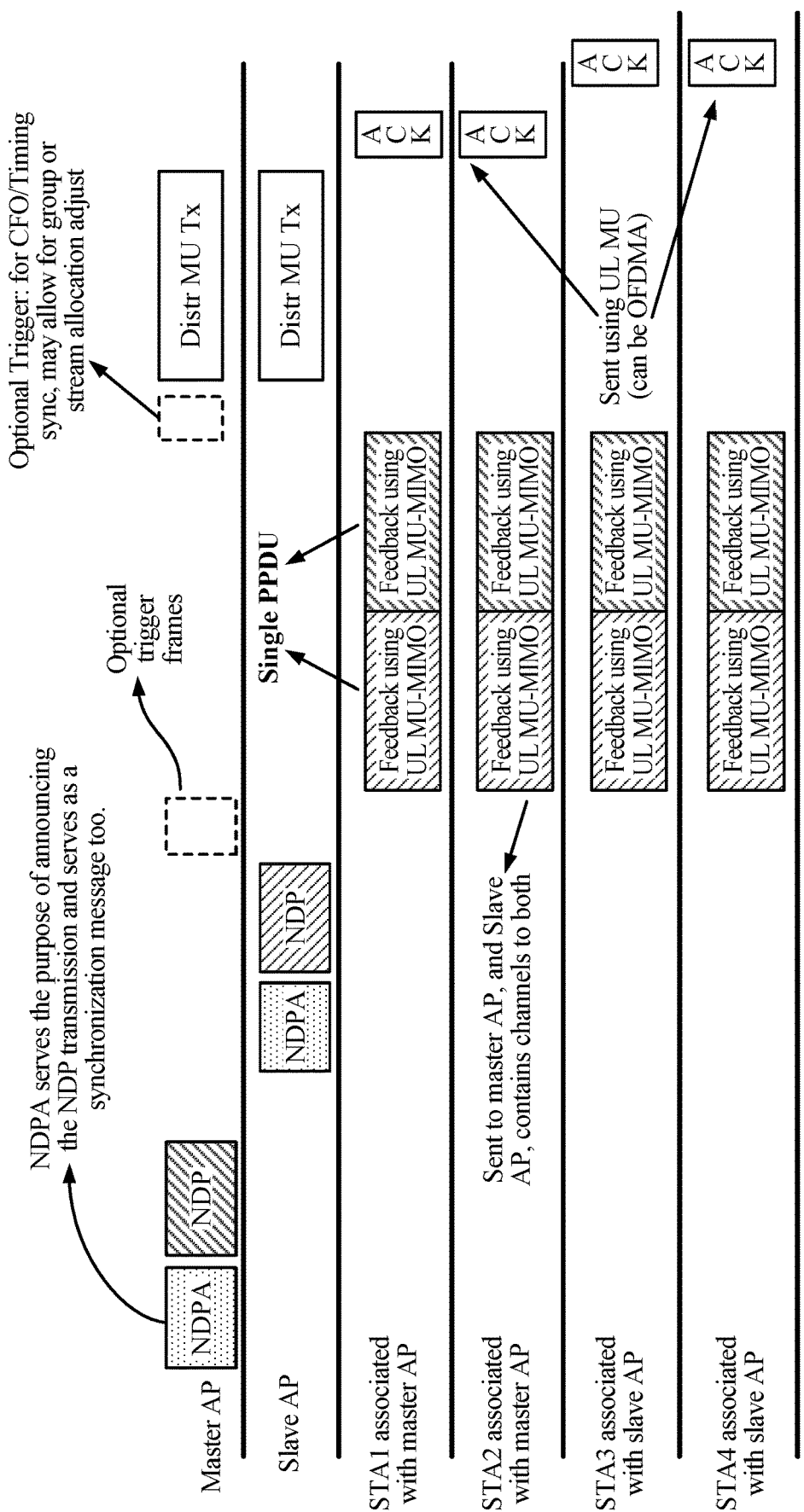
FIG. 10 illustrates a communication protocol for CoBF including explicit sounding, in accordance with certain aspects of the present disclosure.

FIG. 10 illustrates a communication protocol (referred to herein as A2) for CoBF including explicit sounding, in accordance with certain aspects of the present disclosure. Particularly, FIG. 10 shows sequential NDP along with UL MU-MIMO where both APs receive all four feedback streams without nulling. Again, in this example, it may be assumed that group formation has taken place before NDPA, such that the NDPA may identify all stations STAs and number streams being allocated to each station.

As shown in FIG. 10, the master AP and the slave AP may transmit their respective NDPA and NDP sequentially. This may be follow by an optional trigger frame. In this example, the stations (STA1, STA2, STA3, and STA4) may each then transmit feedback using UL MU-MIMO that contains information for channels to both to both the master AP and the slave AP. This may be done using a single protocol data unit (PDU), such as a physical PDU (PPDU), as shown in the figure. These feedback transmissions may then be followed by the optional trigger for CFO/Timing synchronization that may allow for group or stream allocation adjustments.

What follows then may include distributed transmissions (Distr MU Tx) and acknowledgements (ACK) from the stations (STA1 through STA4). As illustrated, in some cases, the acknowledgements may be sent using UL MU (can be OFDMA). In one or more cases the ACKs of the two BSSs may be sent in parallel using coordinated UL MU-MIMO.

Rate and power control may be complex with the communication protocols A1 and A2, as disclosed in FIGS. 9 and 10. Therefore, other variations on these protocols may be provided in accordance with certain aspects. As an example, in protocol A1 and A2, the UL MU-MIMO feedback may consist of STAs 1, 2, 3 and 4 transmitting their CSI to the AP together. An AP may receive UL MU-MIMO with STAs of its own BSS and STAs of an OBSS. However, the powers of in-BSS and OBSS STAs might be very different, making rate and power control more complex.

Figure 11:
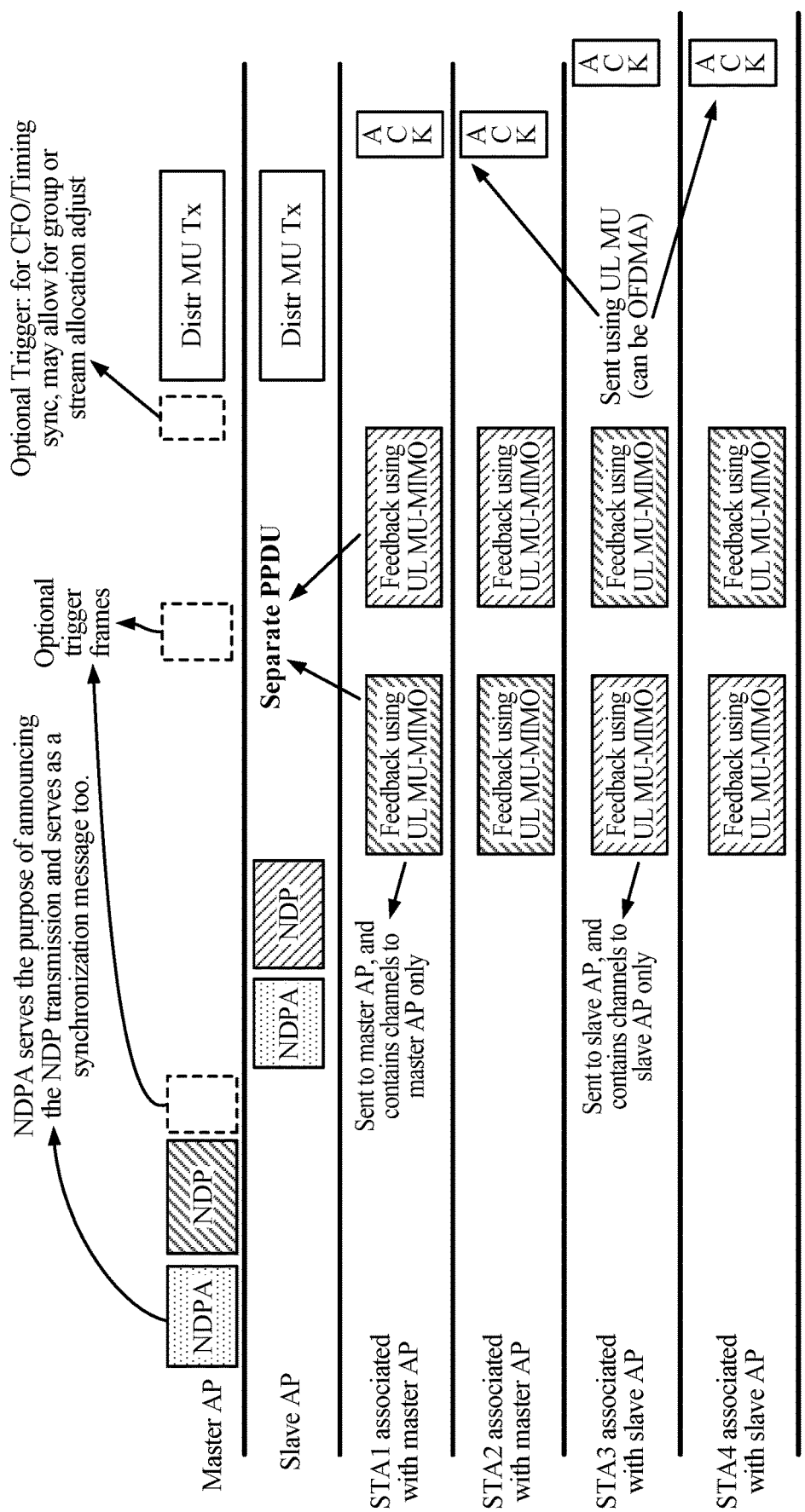
FIG. 11 illustrates a communication protocol for CoBF including explicit sounding, in accordance with certain aspects of the present disclosure.

Accordingly, one or more other variations may be provided for transmitting the CSI feedback that may help avoid or reduce this complexity. For example, another communication protocol (referred to as A3) as shown in FIG. 11, may have stations from different BSSs transmit at different times. For example, STA1 and STA2 may transmit to their AP, while STA3 and STA4 transmit to their AP at a first time, followed by both pairs transmitting to their OBSS APs at a second time. In this case, both APs may use some of the dimensions to null out the unwanted streams in CSI feedback. For example the APs may use coordinated UL MU-MIMO to provide dual of CoBF in the DL.

Aspects of the present disclosure provide various ways to multiplex NDPs from different APs or transmissions from STAs at the same time. For example, using frequency division multiplexing (FDM), each stream may be allocated different tones in each long training field (LTF) symbol, with the AP demultiplexing the streams prior to performing the channel estimation (extracting streams of interest and discarding others). In some cases, along with FDM, a beam steering matrix (P-matrix) may be used to spatially multiplex the streams of an AP, while different APs are allocated non-overlapping tones. As an alternative, all streams (from all APs) could be multiplexed using a large P-matrix. Using time division multiplexing (TDM), one stream may be allocated one LTF. This TDM approach could be combined with P-matrix multiplexing, for example, with one AP's streams multiplexed using a P-matrix, while different APs are active on different LTF symbols.

The communication protocol (A3) shown in FIG. 11 includes sequential NDP and coordinated UL MU-MIMO where multiple APs receive CSI feedback together while using spatial dimensions to null out some streams. Again, it may be assumed that group formation has taken place before the NDPA transmission, such that the NDPA transmission may identify all STAs and number streams being allocated to each STA. Further, the NDPA may serve the purpose of announcing the NDP transmission and may serve as a synchronization message as well. In one or more cases, an optional trigger frame may be provided after the NDPA and NDP transmissions as shown. The stations (STA1 through STA4) may then respond by transmitting feedback using UL MU-MIMO back to the corresponding AP that sent the NDPA and NDP. After this feedback portion of the protocol distributed transmissions may follow along with acknowledgements as shown.

For example, a master AP may transmit NDPA, NDP, and an optional trigger frame, followed by a slave AP transmitting its own NDPA and NDP. The stations STA1 and STA2 (associated with the master AP) may then, at a first time, transmit feedback using UL MU-MIMO to the master AP that contains channels to the master AP only. In the illustrated example, at the same first time, feedback from stations STA3 and STA4 (associated with the slave AP) was also sent to the slave AP that contains channels to slave AP only.

At a second time, the stations STA1-STA4 switch and STA1 and STA2 transmit to the slave AP, while STA3 and STA4 transmit to the master AP, as shown, using separate PPDUs. An optional trigger frame may be transmitted between the first and second time by the master AP as shown. What follows then may include distributed transmissions (Distr MU Tx) and acknowledgements (ACK) from the stations (STA1 through STA4). The acknowledgements may be sent using UL MU (e.g., OFDMA). In one or more cases, the ACKs of the two BSSs may be sent in parallel using coordinated UL MU-MIMO.

Various options may be provided for the communication protocol options A1-A3 described above. For example, for the communication protocol A1, one BSS at a time may provide a collection of CSI feedbacks from all STAs. For the communication protocol A2, all STAs may transmit CSI together in a combined packet that contains CSI to all APs. For the communication protocol A3, STAs may transmit to their own APs first and to OBSS APs. In one or more cases, dual triggers (one from each AP) before a set of UL feedbacks may be implemented. Further, exact location (in time) of triggers may vary from the ones shown in FIGS. 9-11.

Figure 12:
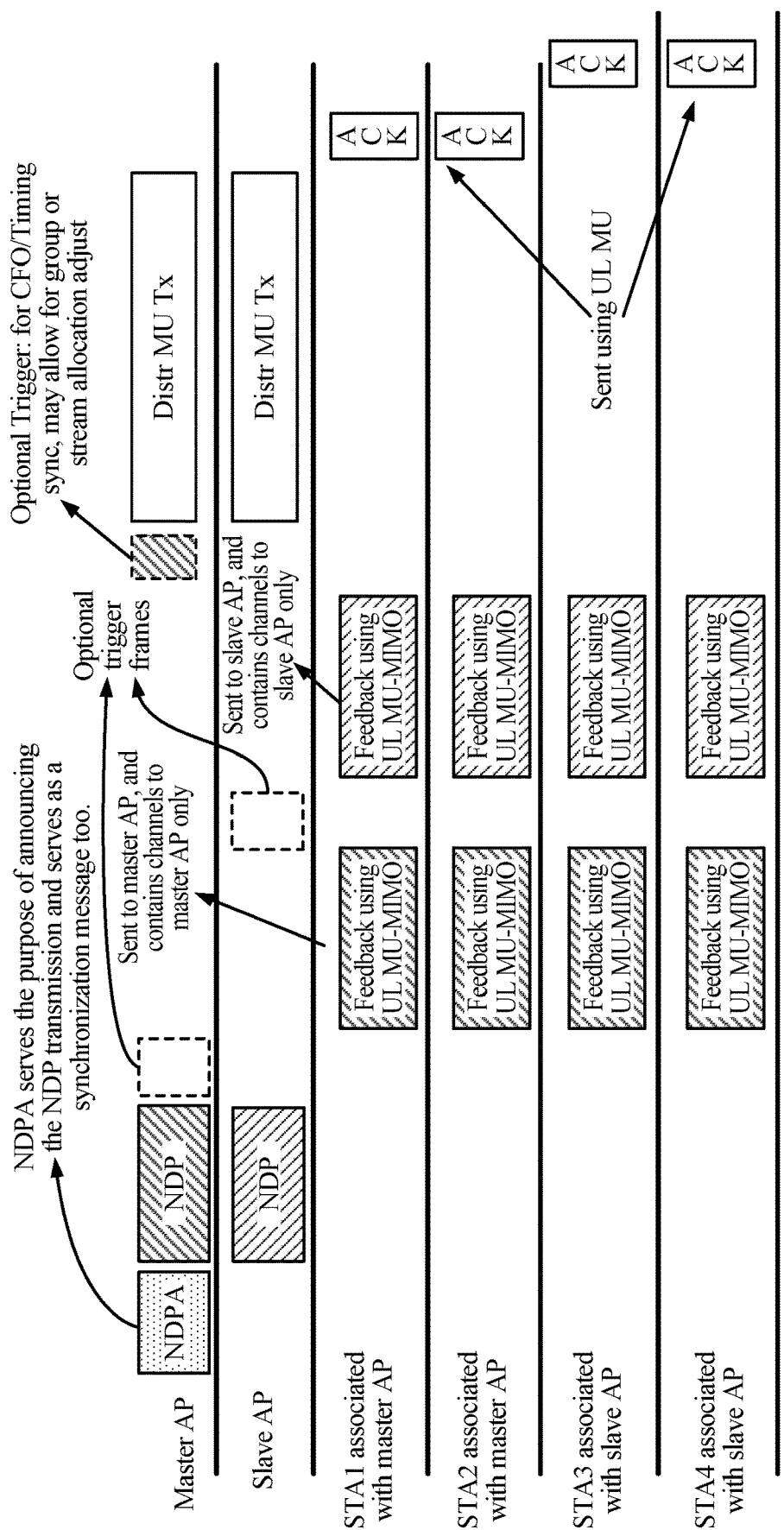
FIG. 12 illustrates a communication protocol for CoBF including explicit sounding, in accordance with certain aspects of the present disclosure.

FIG. 12 illustrates another example communication protocol (referred to as B1) for CoBF including explicit sounding, in accordance with certain aspects of the present disclosure. As shown, the communication protocol may include joint NDP (NDP transmitted jointly from both APs), regular UL MU-MIMO, and separate feedback packets. For example, all the APs may be sounded with one NDP. The master AP may then receive feedback from all stations (STA1-STA4) using UL MU-MIMO at a first time that contains channels to the master AP only. The slave AP may then receive feedback from stations STA1-STA4 using UL MU-MIMO at a second time that contains channels to the slave AP only.

These feedback transmissions may then be followed by an optional trigger for CFO/Timing synchronization that may allow for group or stream allocation adjustments. What follows then may include distributed transmissions (Distr MU Tx) and acknowledgements (ACKs) from the stations (STA1 through STA4), which may be sent using UL MU (e.g., OFDMA). In one or more cases, the ACKs of the two BSSs may be sent in parallel using coordinated UL MU-MIMO.

Figure 13:
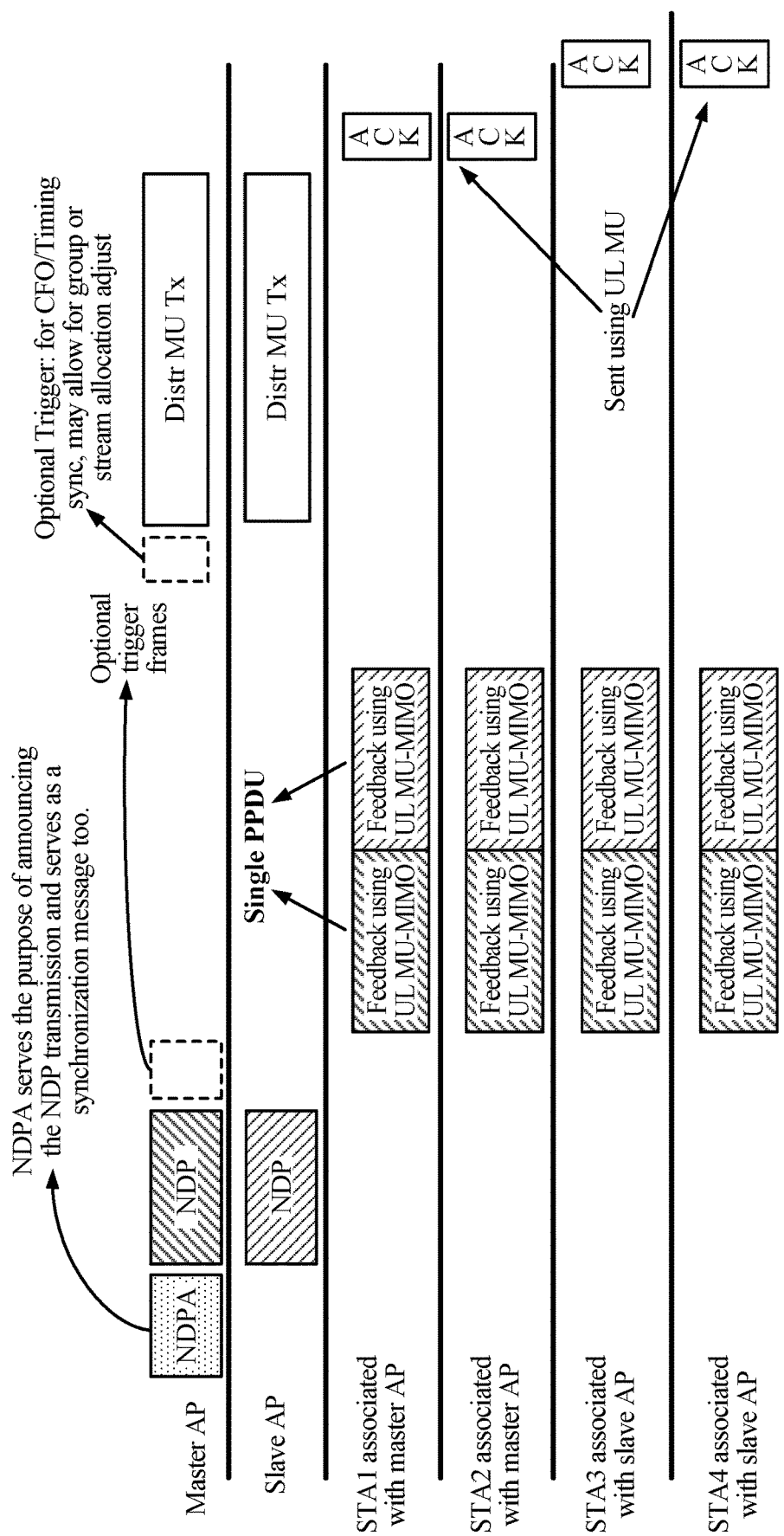
FIG. 13 illustrates a communication protocol for CoBF including explicit sounding, in accordance with certain aspects of the present disclosure.

FIG. 13 illustrates another example communication protocol (referred to as B2) for CoBF including explicit sounding, in accordance with certain aspects of the present disclosure. As shown, the communication protocol B2 may include joint NDP, regular UL MU-MIMO, and combined feedback packets. For example, all the APs may be sounded with one NDP. The master AP and slave AP may then both receive feedback from stations STA1-STA4 using UL MU-MIMO at a first time that contains channels to both master and slave APs using a single PPDU.

These feedback transmissions may then be followed by an optional trigger for CFO/Timing synchronization that may allow for group or stream allocation adjustments. What follows then may include distributed transmissions (Distr MU Tx) and acknowledgements (ACKs) from the stations (STA1 through STA4). The acknowledgements may be sent using UL MU (e.g., OFDMA). In one or more cases, the ACKs of the two BSSs may be sent in parallel using coordinated UL MU-MIMO.

Figure 14:
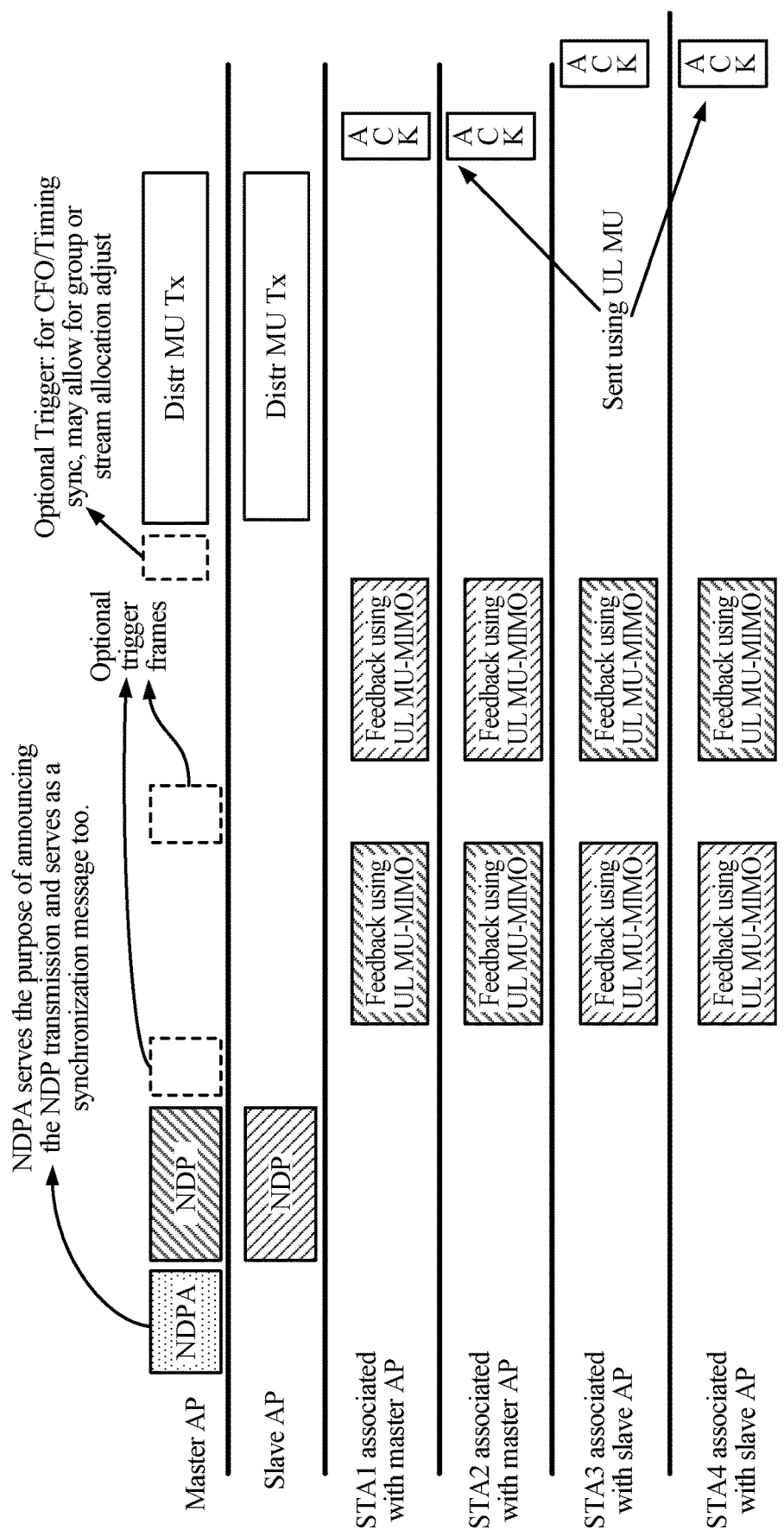
FIG. 14 illustrates a communication protocol for CoBF including explicit sounding, in accordance with certain aspects of the present disclosure.

FIG. 14 illustrates another example communication protocol (B3) for CoBF including explicit sounding, in accordance with certain aspects of the present disclosure. As shown, the communication protocol may include joint NDP, coordinated UL MU-MIMO, and separate feedback packets. For example, all the APs may be sounded with one NDP. The master AP may then receive feedback from stations STA1 and STA2 using UL MU-MIMO at a first time that contains channels to master AP only. The slave AP may receive feedback from stations STA3 and STA4 using UL MU-MIMO at the same first time that contains channels to the slave AP only. At a second (subsequent) time, the master AP may receive feedback from STA3 and STA4, while the slave AP receives feedback from STA1 and STA2 as shown.

These feedback transmissions may then be followed by an optional trigger for CFO/Timing synchronization that may allow for group or stream allocation adjustments. What follows then may include distributed transmissions (Distr MU Tx) and acknowledgements (ACK) from the stations (STA1 through STA4). The acknowledgements may be sent using UL MU (e.g., OFDMA). In one or more cases, the ACKs of the two BSSs may be sent in parallel using coordinated UL MU-MIMO.

Various options may be provided for the communication protocol options B1-B3 described above For example, for the communication protocol B1, one BSS at a time may provide collection of CSI feedbacks from all STAs along with a joint NDP. For the communication protocol B2, all STAs may transmit CSI together in a combined packet that contains CSI to all APs along with a joint NDP. For the communication protocol B3, STAs may transmit to their own APs first and then they may transmit to their OBSS APs along with joint NDP. In one or more cases, dual triggers (one from each AP) before a set of UL feedbacks may be implemented. Further, exact location (in time) of triggers may vary from the ones shown in FIGS. 12-14.

Figure 15:
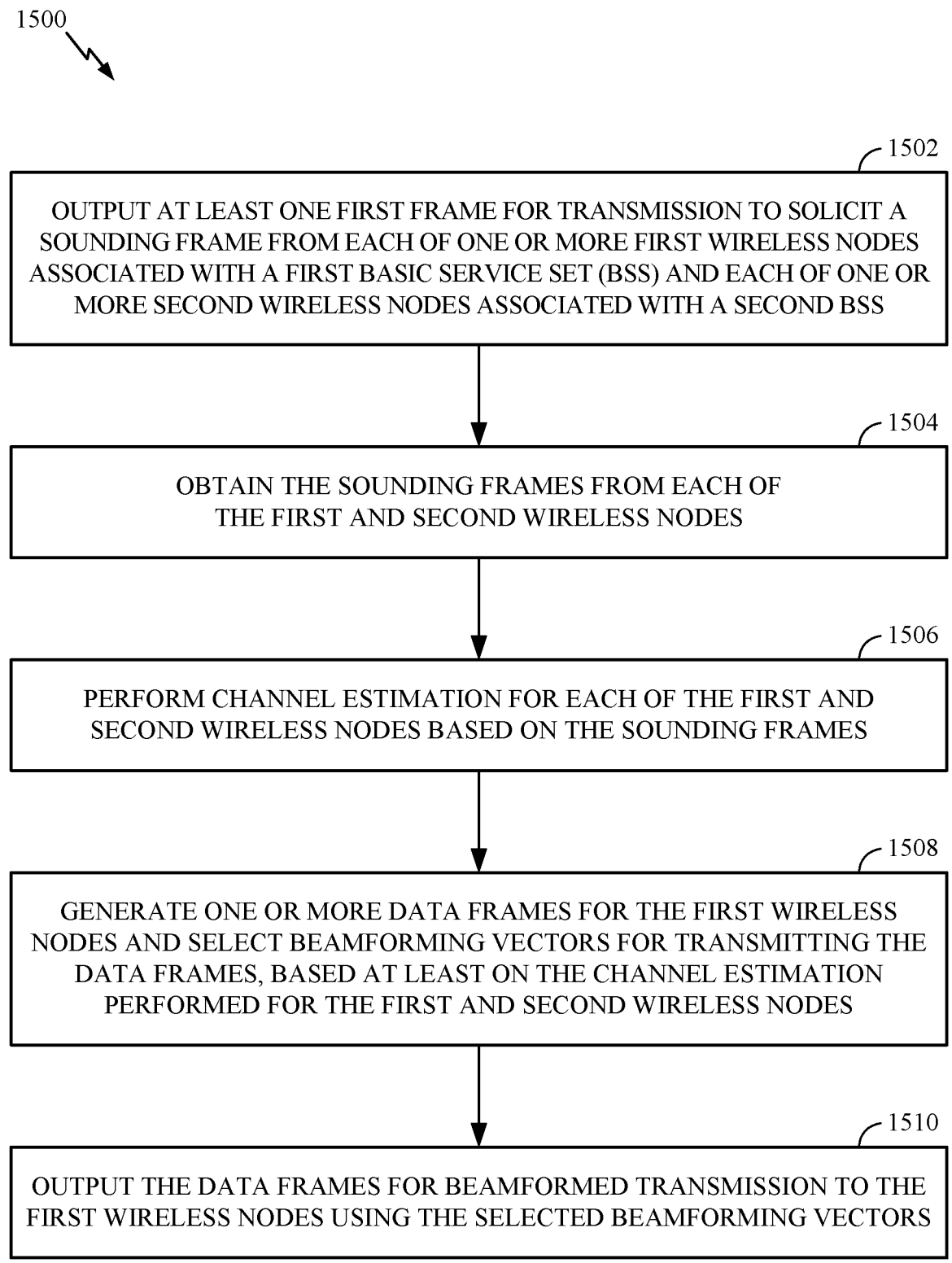
FIG. 15 is a flow diagram of example operations for wireless communication, in accordance with certain aspects of the present disclosure.
Figure 15A:
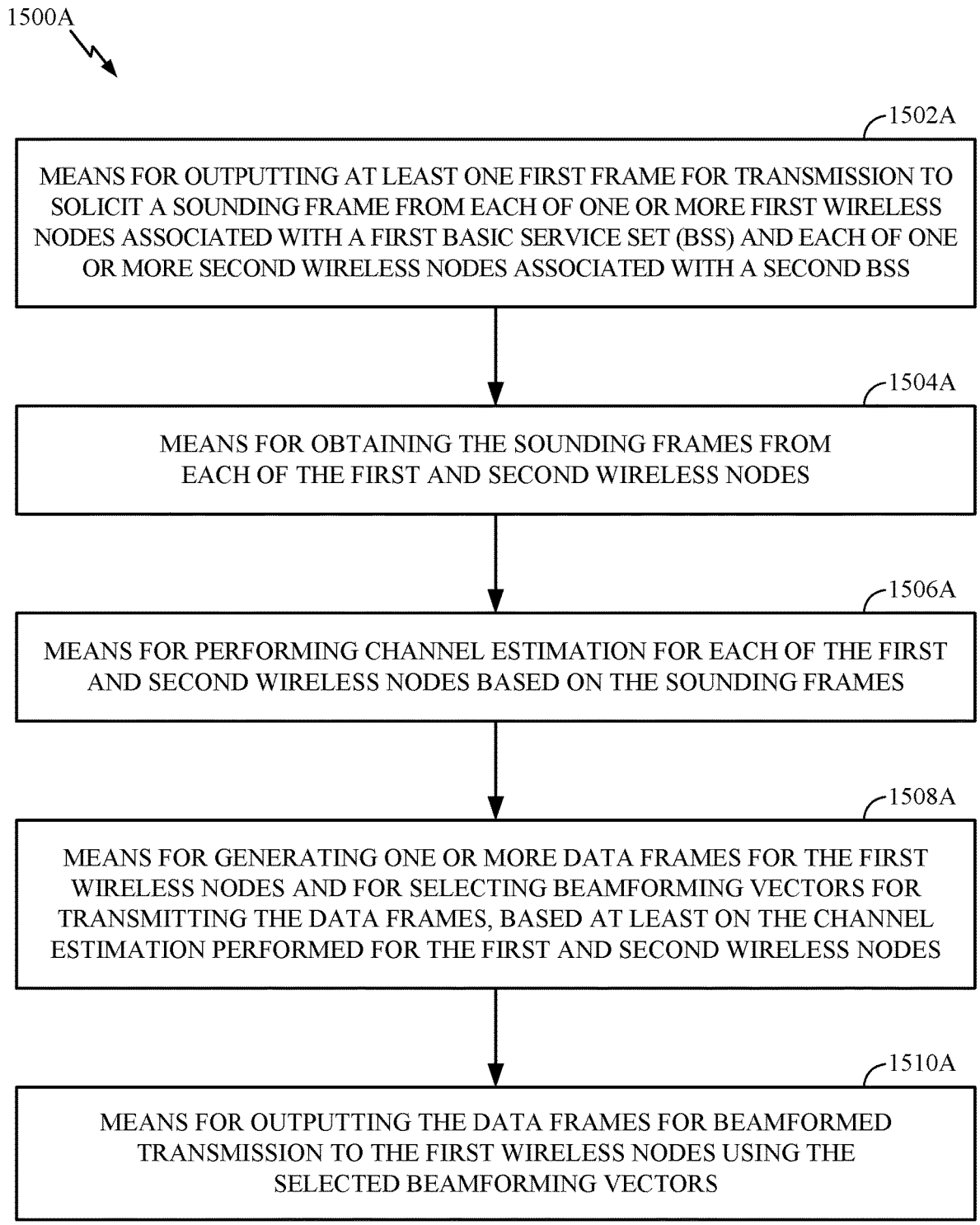
FIG. 15A illustrates example components capable of performing the operations shown in FIG. 15, in accordance with certain aspects of the present disclosure.

FIG. 15 illustrates a flow diagram of example operations 1500 for wireless communications by an apparatus, in accordance with aspects of the present disclosure. For example, operations 1500 may be performed by an AP, such as a master AP.

Operations 1500 begin, at 1502, by outputting at least one first frame for transmission to solicit a sounding frame from each of one or more first wireless nodes associated with a first basic service set (BSS) and each of one or more second wireless nodes associated with a second BSS.

At 1504, the apparatus obtains the sounding frames from each of the first and second wireless nodes. At 1506, the apparatus performs channel estimation for each of the first and second wireless nodes based on the sounding frames.

At 1508, the apparatus generates one or more data frames for the first wireless nodes and selects beamforming vectors for transmitting the data frames, based at least on the channel estimation performed for the first and second wireless nodes. At 1510, the apparatus outputs the generated data frames for beamformed transmission to the first wireless nodes using the selected beamforming vectors.

Figure 16:
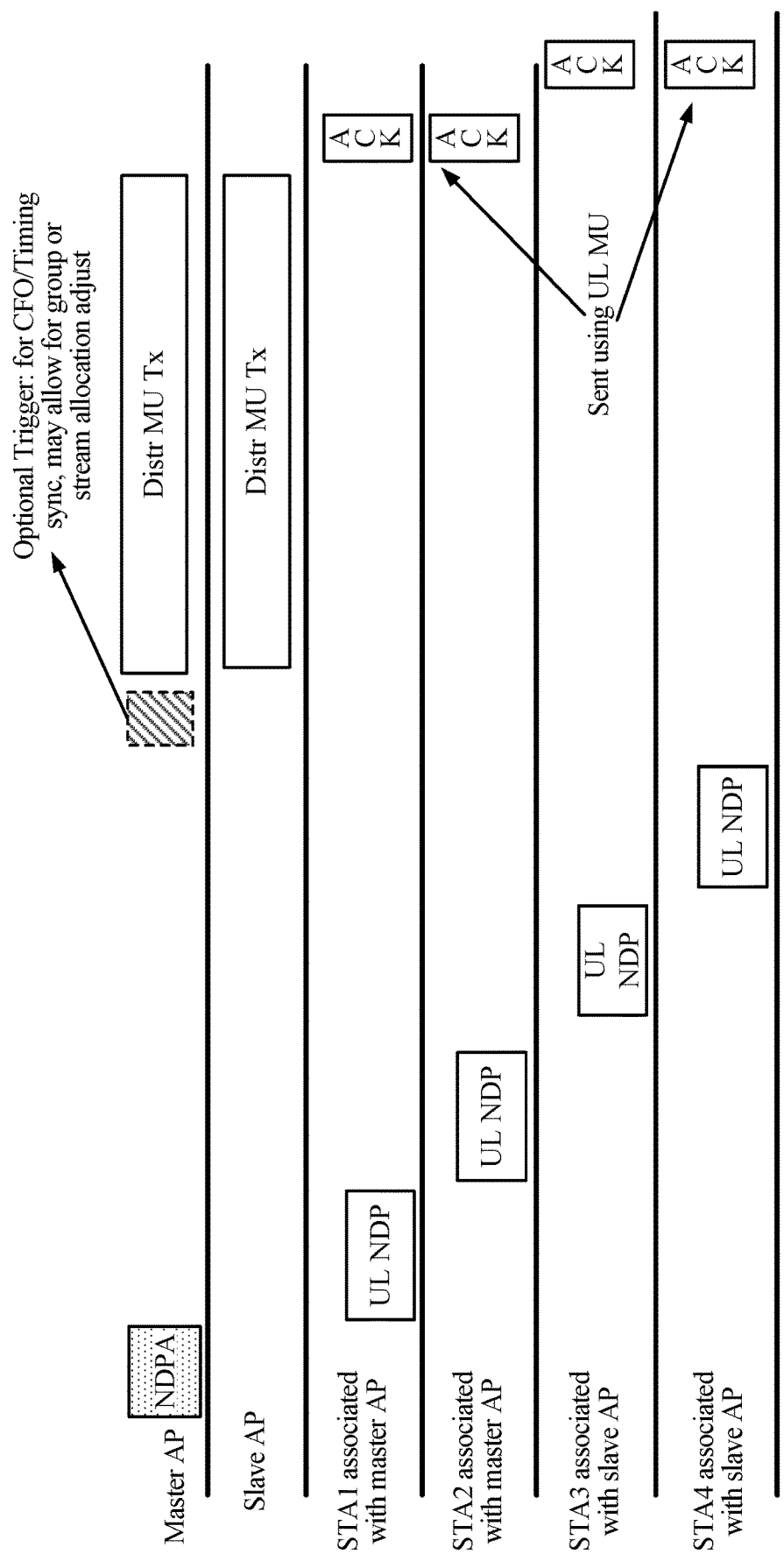
FIG. 16 illustrates a communication protocol including implicit sounding, in accordance with certain aspects of the present disclosure.

FIG. 16 illustrates a communication protocol (C1) including implicit sounding that includes separate NDP for each station. In other words, as illustrated, one station at a time transmits UL NDP transmissions. In one or more embodiments, it may be assumed that group formation may take place over the air (OTA) or over the backhaul. The DL channel estimation (used for subsequent Distributed DL transmissions) may therefore rely on the UL NDP from the STAs.

These UL NDP transmissions may then be followed by the optional trigger for CFO/Timing synchronization that may allow for group or stream allocation adjustments. What follows then may include distributed transmissions (Distr MU Tx) and acknowledgements (ACK) from the stations (STA1 through STA4). The acknowledgements may be sent using UL MU (e.g., OFDMA). In one or more cases, the ACKs of the two BSSs may be sent in parallel using coordinated UL MU-MIMO.

Figure 17:
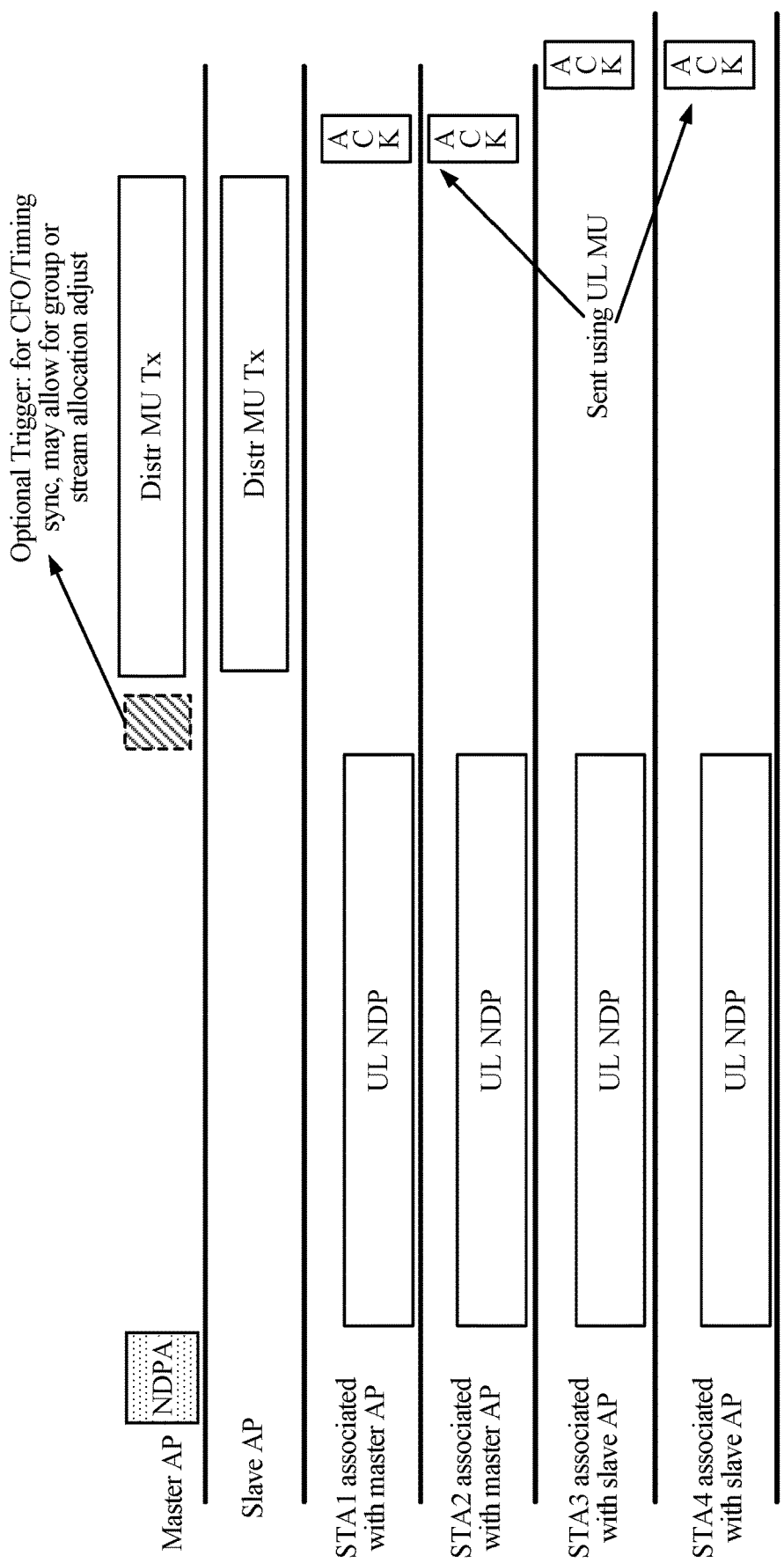
FIG. 17 illustrates a communication protocol including implicit sounding, in accordance with certain aspects of the present disclosure.

FIG. 17 illustrates a communication protocol (C2) including implicit sounding that includes joint NDP for all stations such that all stations (STA1-STA4) transmit the UL NDP transmissions at one time. In this example, the DL channel estimation may therefore rely on the UL NDPs simultaneously sent from all of the STAs.

These UL NDP transmissions may then be followed by the optional trigger for CFO/Timing synchronization that may allow for group or stream allocation adjustments. What follows then may include distributed transmissions (Distr MU Tx) and acknowledgements (ACK) from the stations (STA1 through STA4). As previously noted, the ACKs of the two BSSs may be sent in parallel using coordinated UL MU-MIMO.

In one or more cases, when the NDPs are being sent together in communication protocol option Ce as shown in FIG. 17, the LTFs may be multiplexed using any of the techniques described above with reference to DL NDPs transmitted from multiple APs (e.g., FDM, P-matrix, and/or TDM).

In one or more cases, ACKs may be sent in one BSS using UL MU-MIMO and sequentially across BSSs. In some cases. ACKs may be sent using OFDMA as well. Further, in some cases, the ACKs of multiple BSSs may be sent together as well, for example, using coordinated UL MU-MIMO, coordinated UL OFDMA, or a mixture thereof.

Calibration for implicit sounding may be provided that is designed to be no more complicated than other types of calibration. For example, because each AP may use separate precoding, the gain/phase mismatch of every AP's Tx and Rx chains may be calibrated separately. Such calibration may be performed only occasionally (e.g., only once every few hours). Further, a number of different variations of calibration may be implemented, such as STA assisted, AP assisted, and/or self-calibration. STA assisted calibration may include an AP that exchanges messages with a STA that it has good link budget with. AP assisted calibration may include an AP that exchanges messages with another AP that it has good link budget with.

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c). As used herein, including in the claims, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

As used herein, the term "determining" encompasses a wide variety of actions. For example, "determining" may include calculating, computing, processing, deriving, investigating, looking up (e.g., looking up in a table, a database or another data structure), ascertaining and the like. Also, "determining" may include receiving (e.g., receiving information), accessing (e.g., accessing data in a memory) and the like. Also, "determining" may include resolving, selecting, choosing, establishing and the like.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." For example, the articles "a" and "an" as used in this application and the appended claims should generally be construed to mean "one or more" unless specified otherwise or clear from the context to be directed to a singular form. Unless specifically stated otherwise, the term "some" refers to one or more. Moreover, the term "or" is intended to mean an inclusive "or" rather than an exclusive "or." That is, unless specified otherwise, or clear from the context, the phrase, for example, "X employs A or B" is intended to mean any of the natural inclusive permutations. That is, for example the phrase "X employs A or B" is satisfied by any of the following instances: X employs A; X employs B; or X employs both A and B. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. § 112, sixth paragraph, unless the element is expressly recited using the phrase "means for" or, in the case of a method claim, the element is recited using the phrase "step for."

The various operations of methods described above may be performed by any suitable means capable of performing the corresponding functions. The means may include various hardware and/or software component(s) and/or module(s), including, but not limited to a circuit, an application specific integrated circuit (ASIC), or processor. Generally, where there are operations illustrated in figures, those operations may have corresponding counterpart means-plus-function components with similar numbering. For example, operations 700, 800, and 1500 illustrated in FIGS. 7, 8, and 15 correspond to means 700A, 800A, and 1500A illustrated in FIGS. 7A, 8A, and 15A, respectively.

For example, means for transmitting (or means for outputting for transmission) may comprise a transmitter (e.g., the transmitter unit 222) and/or an antenna(s) 224 of the access point 110 or the transmitter unit 254 and/or antenna(s) 252 of the station 120 illustrated in FIG. 2. Means for receiving (or means for obtaining) may comprise a receiver (e.g., the receiver unit 222) and/or an antenna(s) 224 of the access point 110 or the receiver unit 254 and/or antenna(s) 252 of the station 120 illustrated in FIG. 2. Means for processing, means for extracting, means for performing channel estimation, means for demultiplexing, means for obtaining, means for generating, means for selecting, means for decoding, means for deciding, means for demultiplexing, means for discarding, or means for determining, may comprise a processing system, which may include one or more processors, such as the RX data processor 242, the TX data processor 210, the TX spatial processor 220, and/or the controller 230 of the access point 110 or the RX data processor 270, the TX data processor 288, the TX spatial processor 290, and/or the controller 280 of the station 120 illustrated in FIG. 2.

In some cases, rather than actually transmitting a frame a device may have an interface to output a frame for transmission (a means for outputting). For example, a processor may output a frame, via a bus interface, to a radio frequency (RF) front end for transmission. Similarly, rather than actually receiving a frame, a device may have an interface to obtain a frame received from another device (a means for obtaining). For example, a processor may obtain (or receive) a frame, via a bus interface, from an RF front end for reception.

The various illustrative logical blocks, modules and circuits described in connection with the present disclosure may be implemented or performed with a general purpose processor, a digital signal processor (DSP), an application specific integrated circuit (ASIC), a field programmable gate array (FPGA) or other programmable logic device (PLD), discrete gate or transistor logic, discrete hardware components, or any combination thereof designed to perform the functions described herein. A general-purpose processor may be a microprocessor, but in the alternative, the processor may be any commercially available processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

If implemented in hardware, an example hardware configuration may comprise a processing system in a wireless node. The processing system may be implemented with a bus architecture. The bus may include any number of interconnecting buses and bridges depending on the specific application of the processing system and the overall design constraints. The bus may link together various circuits including a processor, machine-readable media, and a bus interface. The bus interface may be used to connect a network adapter, among other things, to the processing system via the bus. The network adapter may be used to implement the signal processing functions of the PHY layer. In the case of a user terminal 120 (see FIG. 1), a user interface (e.g., keypad, display, mouse, joystick, etc.) may also be connected to the bus. The bus may also link various other circuits such as timing sources, peripherals, voltage regulators, power management circuits, and the like, which are well known in the art, and therefore, will not be described any further. The processor may be implemented with one or more general-purpose and/or special-purpose processors. Examples include microprocessors, microcontrollers, DSP processors, and other circuitry that can execute software. Those skilled in the art will recognize how best to implement the described functionality for the processing system depending on the particular application and the overall design constraints imposed on the overall system.

If implemented in software, the functions may be stored or transmitted over as one or more instructions or code on a computer readable medium. Software shall be construed broadly to mean instructions, data, or any combination thereof, whether referred to as software, firmware, middleware, microcode, hardware description language, or otherwise. Computer-readable media include both computer storage media and communication media including any medium that facilitates transfer of a computer program from one place to another. The processor may be responsible for managing the bus and general processing, including the execution of software modules stored on the machine-readable storage media. A computer-readable storage medium may be coupled to a processor such that the processor can read information from, and write information to, the storage medium. In the alternative, the storage medium may be integral to the processor. By way of example, the machine-readable media may include a transmission line, a carrier wave modulated by data, and/or a computer readable storage medium with instructions stored thereon separate from the wireless node, all of which may be accessed by the processor through the bus interface. Alternatively, or in addition, the machine-readable media, or any portion thereof, may be integrated into the processor, such as the case may be with cache and/or general register files. Examples of machine-readable storage media may include, by way of example, RAM (Random Access Memory), flash memory, phase change memory, ROM (Read Only Memory), PROM (Programmable Read-Only Memory), EPROM (Erasable Programmable Read-Only Memory), EEPROM (Electrically Erasable Programmable Read-Only Memory), registers, magnetic disks, optical disks, hard drives, or any other suitable storage medium, or any combination thereof. The machine-readable media may be embodied in a computer-program product.

A software module may comprise a single instruction, or many instructions, and may be distributed over several different code segments, among different programs, and across multiple storage media. The computer-readable media may comprise a number of software modules. The software modules include instructions that, when executed by an apparatus such as a processor, cause the processing system to perform various functions. The software modules may include a transmission module and a receiving module. Each software module may reside in a single storage device or be distributed across multiple storage devices. By way of example, a software module may be loaded into RAM from a hard drive when a triggering event occurs. During execution of the software module, the processor may load some of the instructions into cache to increase access speed. One or more cache lines may then be loaded into a general register file for execution by the processor. When referring to the functionality of a software module below, it will be understood that such functionality is implemented by the processor when executing instructions from that software module.

Also, any connection is properly termed a computer-readable medium. For example, if the software is transmitted from a website, server, or other remote source using a coaxial cable, fiber optic cable, twisted pair, digital subscriber line (DSL), or wireless technologies such as infrared (IR), radio, and microwave, then the coaxial cable, fiber optic cable, twisted pair, DSL, or wireless technologies such as infrared, radio, and microwave are included in the definition of medium. Disk and disc, as used herein, include compact disc (CD), laser disc, optical disc, digital versatile disc (DVD), floppy disk, and Blu-ray® disc where disks usually reproduce data magnetically, while discs reproduce data optically with lasers. Thus, in some aspects computer-readable media may comprise non-transitory computer-readable media (e.g., tangible media). In addition, for other aspects computer-readable media may comprise transitory computer-readable media (e.g., a signal). Combinations of the above should also be included within the scope of computer-readable media.

Thus, certain aspects may comprise a computer program product for performing the operations presented herein. For example, such a computer program product may comprise a computer-readable medium having instructions stored (and/or encoded) thereon, the instructions being executable by one or more processors to perform the operations described herein. For example, instructions for performing the operations described herein and illustrated in the appended figures.

Further, it should be appreciated that modules and/or other appropriate means for performing the methods and techniques described herein can be downloaded and/or otherwise obtained by a user terminal and/or base station as applicable. For example, such a device can be coupled to a server to facilitate the transfer of means for performing the methods described herein. Alternatively, various methods described herein can be provided via storage means (e.g., RAM, ROM, a physical storage medium such as a compact disc (CD) or floppy disk, etc.), such that a user terminal and/or base station can obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the methods and apparatus described above without departing from the scope of the claims.

What is claimed is:

1. An apparatus for wireless communications, comprising:
    a first interface configured to output at least one first frame for transmission to solicit channel state information (CSI) feedback from each of one or more first wireless nodes associated with a first basic service set (BSS) and from each of one or more second wireless nodes associated with a second BSS;
    a second interface configured to obtain the CSI feedback solicited from the first and second wireless nodes; and
    a processing system configured to generate one or more data frames for the first wireless nodes and to select beamforming vectors for transmitting the data frames, based on at least the CSI feedback solicited from the first wireless nodes and the CSI feedback solicited from the second wireless nodes, wherein the first interface is also configured to output the data frames for beamformed transmission to the first wireless nodes using the selected beamforming vectors.

2. The apparatus of claim 1, wherein the at least one first frame comprises a sounding frame with one or more training fields for the first wireless nodes and the second wireless nodes to use in generating the solicited CSI feedback.

3. The apparatus of claim 1, wherein the at least one first frame comprises at least one trigger frame that indicates when the first wireless nodes and the second wireless nodes should send the solicited CSI feedback.

4. The apparatus of claim 1, wherein the solicited CSI feedback is obtained simultaneously from the first wireless nodes and the second wireless nodes.

5. The apparatus of claim 4, wherein:
    the solicited CSI feedback from each of the first wireless nodes and the second wireless nodes is included in a physical layer protocol data unit (PDU) that also includes CSI feedback generated based on a sounding frame transmitted by another apparatus associated with the second BSS; and
    the processing system is configured to extract the solicited CSI feedback from the PDU and discard the CSI feedback generated based on the sounding frame transmitted by the other apparatus associated with the second BSS.

6. The apparatus of claim 1, wherein:
    the solicited CSI feedback is obtained from the first wireless nodes in a first time interval; and
    the solicited CSI feedback is obtained from the second wireless nodes in a second time interval that does not overlap with the first time interval.

7. The apparatus of claim 6, wherein:
    the solicited CSI feedback from the second wireless nodes is obtained in a single protocol data unit (PDU) that also includes CSI feedback intended for another apparatus;
    the solicited CSI feedback from the first wireless nodes is obtained in another single PDU that also includes CSI feedback intended for the other apparatus; and
    the processing system is configured to discard the CSI feedback from the second wireless nodes intended for the other apparatus and to discard the CSI feedback from the first wireless nodes intended for the other apparatus.

8. The apparatus of claim 1, wherein:
    the at least one first frame comprises a first sounding frame with one or more training fields for the first wireless nodes and the second wireless nodes to use in generating the solicited CSI feedback; and
    the first sounding frame is output for transmission jointly with a second sound frame from another apparatus associated with the second BSS.

9. The apparatus of claim 1, further comprising at least one antenna via which the first frame and data frames are output for transmission and via which the CSI feedback from the first wireless nodes and the second wireless nodes is obtained, wherein the apparatus is configured as a wireless device.

10. An apparatus for wireless communications, comprising:
    a first interface configured to obtain at least one first frame from a first wireless node associated with a first basic service set (BSS) and to obtain at least one second frame from a second wireless node associated with a second BSS, wherein the at least one first frame identifies a plurality of stations (STAs) and a number of transmission streams allocated to each STA of the plurality of STAs for generating channel state information (CSI) feedback;

a processing system configured to generate first channel state information (CSI) feedback based on the first frame and to generate second CSI feedback based on the second frame; and a second interface configured to output the first CSI feedback for transmission to the first wireless node and to output the second CSI feedback for transmission to the second wireless node.

11. The apparatus of claim 10, wherein:
the at least one first frame comprises a first sounding frame with one or more first training fields; and
the processing system is configured to generate the first CSI feedback based on the one or more first training fields.

12. The apparatus of claim 11, wherein:
the at least one second frame comprises a second sounding frame, obtained simultaneously with the first sounding frame, comprising one or more second training fields; and
the processing system is configured to generate the second CSI feedback based on the one or more second training fields.

13. The apparatus of claim 10, wherein:
the at least one first frame comprises at least one trigger frame; and
the second interface is configured to output the first CSI feedback for transmission in response to the trigger frame.

14. The apparatus of claim 10, wherein the first CSI feedback and the second CSI feedback are both output for transmission in a single physical layer protocol data unit (PDU).

15. The apparatus of claim 10, wherein:
the first CSI feedback is output for transmission in a first transmission time interval; and
the second CSI feedback is output for transmission in a second transmission time interval.

16. The apparatus of claim 15, wherein:
the first CSI feedback is output for transmission in the first transmission time interval via multiple user multiple input multiple output (MU-MIMO) transmission simultaneously with CSI feedback from another apparatus; and
the second CSI feedback is output for transmission in the second transmission time interval via MU-MIMO transmission simultaneously with CSI feedback from the other apparatus.

17. The apparatus of claim 10, further comprising at least one antenna via which the first frame and the second frame are obtained and via which the first CSI feedback and the second CSI feedback are output for transmission, wherein the apparatus is configured as a wireless device.

18. The apparatus of claim 10, wherein the at least one second frame identifies the plurality of STAs and the number of transmission streams allocated to each STA of the plurality of STAs for generating the CSI feedback.

19. An apparatus for wireless communications, comprising:
a first interface configured to output at least one first frame for transmission to solicit a sounding frame from each of one or more first wireless nodes associated with a first basic service set (BSS) and each of one or more second wireless nodes associated with a second BSS;
a second interface configured to obtain the sounding frames from each of the first wireless nodes and the second wireless nodes; and
a processing system configured to
perform channel estimation for each of the first and second wireless nodes based on the sounding frames; and
generate one or more data frames for the first wireless nodes and to select beamforming vectors for transmitting the data frames, based at least on the channel estimation performed for the first and second wireless nodes, wherein the first interface is also configured to output the data frames for beamformed transmission to the first wireless nodes using the selected beamforming vectors.

20. The apparatus of claim 19, wherein the second interface is configured to obtain each of the sounding frames in a separate time interval.

21. The apparatus of claim 19, wherein:
the second interface is configured to obtain the sounding frames simultaneously;
each sounding frame comprises at least one training field; and
the processing system is configured to demultiplex training fields from the each of the sounding frames prior to performing the channel estimation.

* * * * *